United States Patent
Wrubel

(10) Patent No.: US 11,279,631 B2
(45) Date of Patent: Mar. 22, 2022

(54) PURIFYING AQUEOUS MIXTURES DERIVED FROM HYDROCARBON PRODUCTION PROCESSES

(71) Applicant: PAN ASIAN CHEMICALS INC., Houston, TX (US)

(72) Inventor: James D. Wrubel, Houston, TX (US)

(73) Assignee: EFC Solutions Inc., Hesston, TX (US)

( * ) Notice: Subject to any disclaimer, the term of this patent is extended or adjusted under 35 U.S.C. 154(b) by 122 days.

(21) Appl. No.: 14/649,071

(22) PCT Filed: Dec. 3, 2013

(86) PCT No.: PCT/US2013/072744
§ 371 (c)(1),
(2) Date: Jun. 2, 2015

(87) PCT Pub. No.: WO2014/089002
PCT Pub. Date: Jun. 12, 2014

(65) Prior Publication Data
US 2015/0321924 A1    Nov. 12, 2015

Related U.S. Application Data

(60) Provisional application No. 61/732,843, filed on Dec. 3, 2012.

(51) Int. Cl.
*C02F 1/22* (2006.01)
*C02F 1/04* (2006.01)
(Continued)

(52) U.S. Cl.
CPC ............... *C02F 1/22* (2013.01); *C02F 1/048* (2013.01); *C02F 1/441* (2013.01); *C02F 1/444* (2013.01);
(Continued)

(58) Field of Classification Search
CPC ....................................................... C02F 1/22
See application file for complete search history.

(56) References Cited

U.S. PATENT DOCUMENTS

| 7,909,098 B2 | 3/2011 | Minnich et al. |
| 2004/0060322 A1 | 4/2004 | Witkamp et al. |

(Continued)

FOREIGN PATENT DOCUMENTS

WO    2012021402    2/2012

OTHER PUBLICATIONS

Van der Ham et al., "Eutectic freeze crystallization: Application to process streams and waste water purification", Chemical Engineering and Processing, Elsevier Sequoia, Lausanne, CH, vol. 37, No. 2, Mar. 1, 1998, pp. 207-231.

(Continued)

*Primary Examiner* — Peter Keyworth
(74) *Attorney, Agent, or Firm* — Eidmonds & Cmaidalka, P.C

(57) ABSTRACT

A method for purifying an aqueous mixture is provided. The method can include at least partially crystallizing an aqueous mixture derived from a hydrocarbon process to provide a crystallized aqueous mixture. The aqueous mixture can comprise water and one or more contaminants to be separated from the water. The crystallized aqueous mixture can be separated into a contaminant-rich fraction and a water-rich fraction. Water can be recovered from the water-rich fraction and the one or more contaminants can be recovered from the contaminant-rich fraction.

17 Claims, 8 Drawing Sheets

(51) Int. Cl.
*C02F 1/44* (2006.01)
*C02F 1/52* (2006.01)
C02F 103/10 (2006.01)
C02F 103/36 (2006.01)
C02F 1/02 (2006.01)
C02F 1/00 (2006.01)
C02F 1/38 (2006.01)

(52) U.S. Cl.
CPC ............... *C02F 1/52* (2013.01); *C02F 1/004* (2013.01); *C02F 1/025* (2013.01); *C02F 1/38* (2013.01); *C02F 2001/007* (2013.01); *C02F 2001/5218* (2013.01); *C02F 2103/10* (2013.01); *C02F 2103/365* (2013.01); *C02F 2209/001* (2013.01); *C02F 2209/01* (2013.01); *C02F 2209/05* (2013.01); *C02F 2209/06* (2013.01); *C02F 2209/10* (2013.01)

(56) References Cited

U.S. PATENT DOCUMENTS

2010/0038310 A1 2/2010 Shafer et al.
2012/0097609 A1 4/2012 Xia et al.
2012/0234765 A1 9/2012 SenGupta et al.
2013/0331624 A1* 12/2013 Fan .................. C10G 21/27
585/241

OTHER PUBLICATIONS

PCT/US2013/072744, European Extended Search Report dated Mar. 16, 2016.
Van Spronsen et al., "Eutectic freeze crystallization from the ternary Na2CO3—NaHCO3—H2O system", Chemical Engineering Research and Design, Elsevier, Amsterdam, NL, vol. 88, No. 9, Sep. 1, 2010, pp. 1259-1263.
Genceli, "Scaling-Up Eutectic Freeze Crystallization" in: "Scaling-Up Eutectic Freeze Crystallization", Jan. 25, 2008, Technische Universiteit Delft, Delft, vol. 115.
Willem van der Tempel, "Eutetic Freeze Crystallization: Separation of Salt and Ice", Master Thesis, Delft University of Technology, Jun. 2012.
X Lu et al. ("Desalination of oil coproduced saline water by eutectic freeze crystallization", BIWIC 2012—19th international workshop on industrial crystallization, Sep. 9, 2012, XP055438522, Tianjin, Retrieved from the Internet: https://pure.tudelft.nl/portal/en/publications/desalination-of-oil-coproduced-saline-water-by-eutectic-freeze-crystallization(66a0457c-9e92-46ff-beb5-8602423bd0b9).html on Jan. 5, 2018.

* cited by examiner

PURIFYING AQUEOUS MIXTURES DERIVED FROM HYDROCARBON PRODUCTION PROCESSES

CROSS-REFERENCE TO RELATED APPLICATION

This application claims priority to U.S. Provisional Patent Application having Ser. No. 61/732,843, filed Dec. 3, 2012, which is incorporated by reference herein.

BACKGROUND

Field

Embodiments described herein generally relate to methods and systems for separating contaminants from aqueous mixtures that are derived from hydrocarbon processes. More particularly, such embodiments relate to a crystallization separation process for separating contaminants from aqueous mixtures that are derived from hydrocarbon processes.

Description of the Related Art

Hydrocarbon processes include the extraction of hydrocarbons through hydraulic fracturing, the isolation of hydrocarbons from oil tar sands, the desalting of hydrocarbons, steam-assisted gravity drainage, and the like. These processes, among others, require the use of one or more additives and large volumes of water as carriers or solvents to facilitate the production of hydrocarbons. At least some of the contaminants contained in the hydrocarbons are typically solvated, suspended, or otherwise mixed with the additive and/or water utilized during the hydrocarbon processes. The additives and contaminants, such as organic and/or inorganic compounds, accumulate when combined with water to generate an aqueous mixture. The additives and contaminants in the aqueous mixture need to be removed prior to reuse or disposal of the water.

Currently, aqueous mixtures derived from the hydrocarbon processes are subjected to a separation process to remove the additives and/or contaminants and provide water having a reduced concentration of the additives and/or contaminants. Typical separation processes for removing these additives and/or contaminants from the aqueous mixture include evaporative crystallization, reverse osmosis, extractive crystallization, and ion exchange. Implementation of these separation processes, however, has proven to be difficult or economically impractical for separating aqueous mixtures that contain salts, acids, and/or organic contaminants because of limited yields, high energy requirements, limited applicability to particular contaminants, and costs of operation.

There is a need, therefore, for improved methods and systems for the separation of additives and/or contaminants contained in aqueous mixtures that are derived from hydrocarbon processes.

SUMMARY

Methods for purifying an aqueous mixture are provided. In at least one specific embodiment, the method can include at least partially crystallizing an aqueous mixture derived from a hydrocarbon process to provide a crystallized aqueous mixture. The aqueous mixture can include water and one or more contaminants to be separated from the water. The method can also include separating the crystallized aqueous mixture into a contaminant-rich fraction and a water-rich fraction. The method can further include recovering water from the water-rich fraction, and recovering the one or more contaminants from the contaminant-rich fraction.

In at least one other specific embodiment, the method for purifying an aqueous mixture can include characterizing an aqueous mixture derived from a hydrocarbon process to determine one or more contaminants present therein. Characterizing the aqueous mixture can include determining a conductivity of the aqueous mixture, a pH of the aqueous mixture, a density of the aqueous mixture, or a combination thereof. The method can also include at least partially crystallizing the aqueous mixture to provide a crystallized aqueous mixture. The method can further include separating the crystallized aqueous mixture into a contaminant-rich fraction and a water-rich fraction. The method can also include recovering water from the water-rich fraction, and recovering the one or more contaminants from the contaminant-rich fraction.

In at least one specific embodiment, a system for purifying an aqueous mixture is provided. The system can include a crystallizer coupled to a refrigeration system. The crystallizer can be adapted to at least partially crystallize an aqueous mixture derived from a hydrocarbon process to provide a crystallized aqueous mixture. The aqueous mixture can include water and one or more contaminants to be separated from the water. A feed line can be coupled to the crystallizer for introducing the aqueous mixture thereto. The system can also include a separator for separating the crystallized aqueous mixture into a contaminant-rich fraction and a water-rich fraction. The system can further include a wash column coupled to the separator and adapted to recover water from the water-rich fraction. A filter can be coupled to the separator and adapted to recover the one or more contaminants from the contaminant-rich fraction.

DETAILED DESCRIPTION

Figure 1:
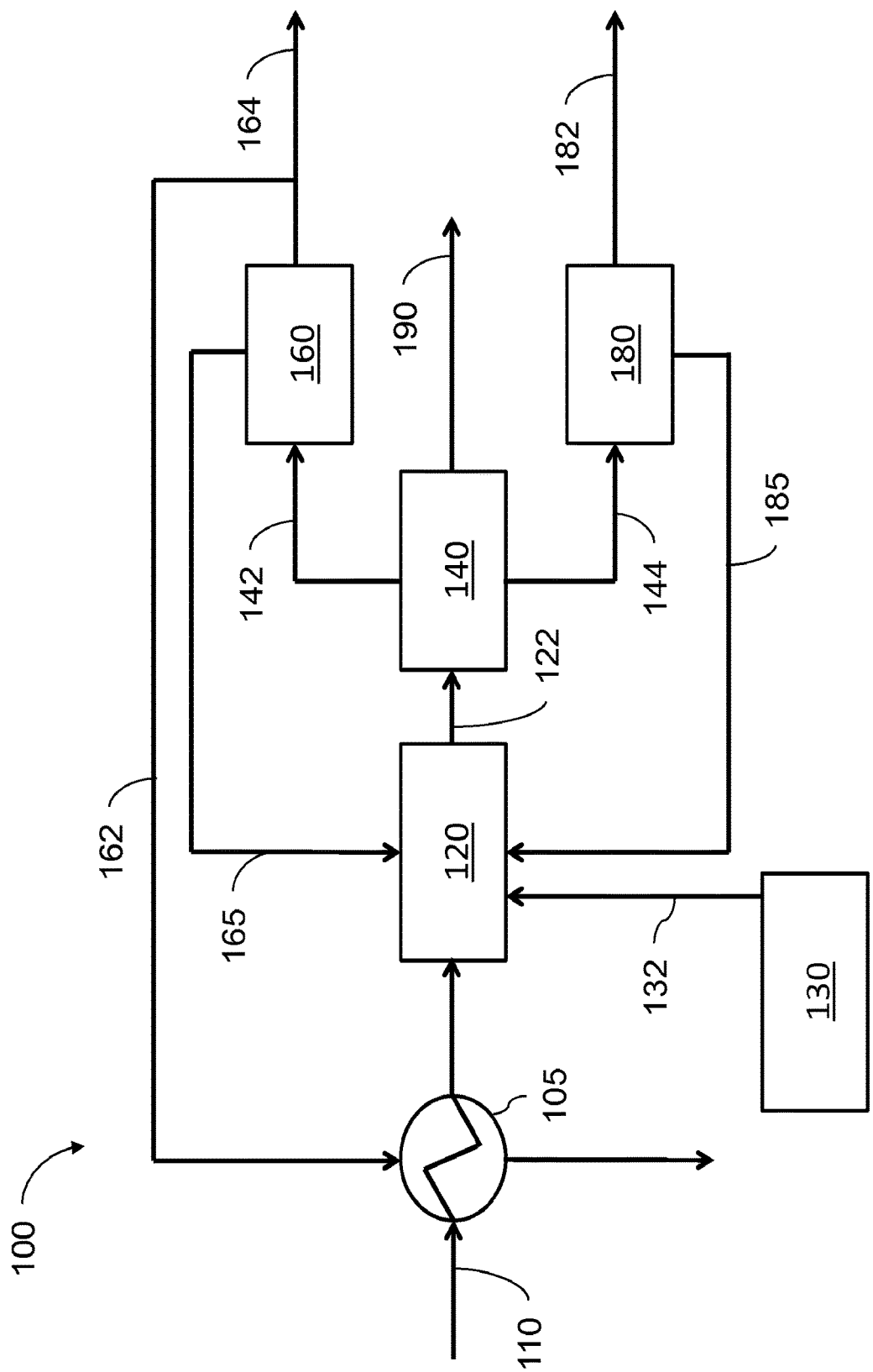
FIG. 1 depicts a schematic of an illustrative system for separating contaminants from an aqueous mixture, according to one or more embodiments described.

Methods and systems for purifying an aqueous mixture derived from hydrocarbon processes are provided. The aqueous mixture derived from one or more hydrocarbon processes can be purified to remove additives (e.g., chemical additives) and/or other contaminants contained therein by crystallization and separation. The aqueous mixture can be at least partially crystallized by cooling or freezing to produce a crystallized aqueous mixture including solid forms of water and/or contaminants that can be easily separated in their solid forms. The crystallized aqueous mixture can contain varying amounts of ice, solidified or crystallized contaminants, and "mother liquor." The mother liquor can include any non-crystallized water, non-crystallized contaminant, and/or non-crystallizable contaminants. As will be discussed in more detail below, the crystallized aqueous mixture can be separated into a water-rich fraction and a contaminant-rich fraction due to their relative density differences. The crystals or solids in the separated fractions can be suspended in the mother liquor. The mother liquor can be separated from the solids or crystals.

The aqueous mixture can be produced, formed, generated, made, or otherwise derived from one or more hydrocarbon processes. The hydrocarbon processes can include, but are not limited to, hydrocarbon extraction, upgrading, separation, desalination, or any other process known in the production of hydrocarbons. Illustrative hydrocarbon extraction processes can include, but are not limited to, steam assisted gravity drainage, oil sand recovery operation, and hydraulic fracturing. Illustrative hydrocarbon upgrading process can include, but are not limited to, refining, separation, purification, and desalting. Illustrative desalination processes can include, but are not limited to, multi-stage flash distillation (MSF), reverse osmosis (RO), multi-effect distillation (MED), mechanical vapor compression (MVC), or any combination thereof.

The aqueous mixture can be or include brine utilized, produced, formed, generated, made, or otherwise derived from the hydrocarbon processes. The term "brine" can be any water-based solution or mixture containing any one or more salts (e.g., inorganic and/or organic salts) at varying concentrations, and can have a density greater than fresh water. For example, the brine can be, but is not limited to, an aqueous solution or mixture of a sodium, calcium, or zinc bromide salt, or any combination or mixture thereof. The aqueous mixture can include one or more phases, and at least one of the phases can be a brine phase. The aqueous mixture and/or the brine can be or include seawater. The concentration of the salts in the brine can be greater than, less than, or substantially equal to seawater. The aqueous mixture and/or the brine can be used during the one or more hydrocarbon processes. For example, the brine can be used as a well-control fluid during the completion and workover phases of the hydrocarbon processes. The aqueous mixture and/or the brine can be formed during the one or more hydrocarbon processes. For example, a waste stream from the one or more hydrocarbon processes may form the aqueous mixture including the brine. The brine can be purified and/or desalinated to remove the salts contained therein by crystallization and separation. For example, saltwater, such as seawater, can be desalinated by crystallization and separation to produce fresh water. In another example, a waste stream from a desalination plant, such as a water reclamation plant, can be purified to remove the salts contained therein by crystallization and separation.

The term "brine" can further refer to any water-based solution or mixture containing at least about 1 wt % of the salts. For example, the concentration of the salts in the brine can be from a low of about 1 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt % to a high of about 15.5 wt %, about 16 wt %, about 16.5 wt %, about 17 wt %, about 17.5 wt %, about 18 wt %, about 18.5 wt %, about 19 wt %, about 19.5 wt %, about 20 wt %, about 20.5 wt %, about 21 wt %, about 21.5 wt %, about 22 wt %, about 22.5 wt %, about 23 wt %, about 23.5 wt %, about 24 wt %, about 24.5 wt %, about 25 wt %, about 25.5 wt %, about 26 wt %, about 26.5 wt %, about 27 wt %, about 27.5 wt %, about 28 wt %, about 28.5 wt %, about 29 wt %, or about 30 wt %. In another example, the concentration of the salts in the brine can be from about 1 wt % to about 30 wt %, about 2 wt % to about 29 wt %, about 3 wt % to about 28 wt %, about 4 wt % to about 27 wt %, about 5 wt % to about 26 wt %, about 6 wt % to about 25 wt %, about 7 wt % to about 24 wt %, about 8 wt % to about 23 wt %, about 9 wt % to about 22 wt %, about 10 wt % to about 21 wt %, about 11 wt % to about 20 wt %, about 12 wt % to about 19 wt %, about 13 wt % to about 18 wt %, about 14 wt % to about 17 wt %, or about 15 wt % to about 16 wt %. In another example, the concentration of the salts in the brine can be greater than about 1 wt %, greater than about 1.5 wt %, greater than about 2.0 wt %, greater than about 2.5 wt %, greater than about 3.0 wt %, greater than about 3.5 wt %, greater than about 4.0 wt %, greater than about 4.5 wt %, greater than about 5.0 wt %, greater than about 5.5 wt %, greater than about 6.0 wt %, greater than about 6.5 wt %, greater than about 7.0 wt %, greater than about 7.5 wt %, greater than about 8.0 wt %, greater than about 8.5 wt %, greater than about 9.5 wt %, greater than about 10 wt %, greater than about 10.5 wt %, greater than about 11 wt %, greater than about 11.5 wt %, greater than about 12 wt %, greater than about 12.5 wt %, greater than about 13 wt %, greater than about 13.5 wt %, greater than about 14 wt %, greater than about 14.5 wt %, greater than about 15.5 wt %, greater than about 16 wt %, greater than about 16.5 wt %, greater than about 17 wt %, greater than about 17.5 wt %, greater than about 18 wt %, greater than about 18.5 wt %, greater than about 19 wt %, greater than about 19.5 wt %, greater than about 20 wt %, greater than about 20.5 wt %, greater than about 21 wt %, greater than about 21.5 wt %, greater than about 22 wt %, greater than about 22.5 wt %, greater than about 23 wt %, greater than about 23.5 wt %, greater than about 24 wt %, greater than about 24.5 wt %, greater than about 25 wt %, greater than about 25.5 wt %, greater than about 26 wt %, greater than about 26.5 wt %, greater than about 27 wt %, greater than about 27.5 wt %, greater than about 28 wt %, greater than about 28.5 wt %, or greater than about 29 wt %. In another example, the concentration of the salt in the brine can be less than about 1 wt %, less than about 1.5 wt %, less than about 2.0 wt %, less than about 2.5 wt %, less than about 3.0 wt %, less than about 3.5 wt %, less than about 4.0 wt %, less than about 4.5 wt %, less than about 5.0 wt %, less than about 5.5 wt %, less than about 6.0 wt %, less than about 6.5 wt %, less than about 7.0 wt %, less than about 7.5 wt %, less than about 8.0 wt %, less than about 8.5 wt %, less than about 9.5 wt %, less than about 10 wt %, less than about 10.5 wt %, less than about 11 wt %, less than about 11.5 wt %, less than about 12 wt %, less than about 12.5 wt %, less than about 13 wt %, less than about 13.5 wt %, less than about 14 wt %, less than about 14.5 wt %, less than about 15.5 wt %, less than about 16 wt %, less than about 16.5 wt %, less than about 17 wt %, less than about 17.5 wt %, less than about 18 wt %, less than about 18.5 wt %, less than about 19 wt %, less than about 19.5 wt %, less than about 20 wt %, less than about 20.5 wt %, less than about 21 wt %, less than about 21.5 wt %, less than about 22 wt %, less than about 22.5 wt %, less than about 23 wt %, less than about 23.5 wt %, less than about 24 wt %, less than about 24.5 wt %, less than about 25 wt %, less than about 25.5 wt %, less than about 26 wt %, less than about 26.5 wt %, less than about 27 wt %, less than about 27.5 wt %, less than about 28 wt %, less than about 28.5 wt %, less than about 29 wt %, or less than about 30 wt %.

The aqueous mixture can include one or more crystallizable and/or non-crystallizable contaminants solubilized, emulsified, and/or suspended therein. The contaminants can be organic or inorganic salts. The contaminants can be one or more acidic compounds or components. The contaminants can be one or more basic or alkaline compounds or components.

The crystallizable contaminants can be or include any material having a quality or ability to form one or more crystals under any one or more conditions. The conditions in which the one or more crystals can be formed can be determined, at least in part, by the temperature and/or concentration of the crystallizable contaminants in the aqueous mixture. As further described herein, the conditions in which the one or more crystals can be formed can also be determined, at least in part, by the number and/or the type of contaminants contained in the aqueous mixture. Illustrative crystallizable contaminants in the aqueous mixture can include, but are not limited to, sodium chloride hydrate, calcium sulfate hydrate, magnesium sulfate hydrates, urea, hydrates of methane, or any combination thereof.

The non-crystallizable contaminants can be or include any material without a quality or ability to form one or more crystals. Illustrative non-crystallizable contaminants in the aqueous mixture can include, but are not limited to, complex organic molecules, suspended solids, hydrocarbon residues, organic functional molecules, or any mixture or combination thereof. Illustrative complex organic molecules can include, but are not limited to, derivatives of cellulose, guar, carob gum, or any combination thereof. Illustrative suspended solids can include, but are not limited to, mud, sand, clay, rock, silt, or any combination thereof. Illustrative hydrocarbon residues can include, but not limited to, naphtha and other hydrocarbons. Illustrative organic functional molecules can include, but are not limited to alcohols, acids, ketones, or any combination thereof. Other non-crystallizable contaminants can include one or more surfactants. Surfactants can include any compound that lowers the surface tension of a liquid, the interfacial tension between two liquids, or the interfacial tension between a liquid and a solid. Illustrative surfactants can include, but are not limited to, additives that act as detergents, wetting agents, emulsifiers, foaming agents, dispersants, or any combination thereof. For example, the surfactants can include, but are not limited to, alkylphenol ethoxylate surfactants, fatty alcohol polyglycol ether surfactants, petroleum sulfonates, or any combination thereof.

Illustrative organic and inorganic salts can include, but are not limited to, nitrates, phosphates, oxalates, sulfates, ammonium salts, potassium salts, calcium salts, magnesium salts, barium salts, salts of metal ions, chlorides of one or more cations, and alkali metals and/or alkaline earth metals. Illustrative inorganic salts may also include, but are not limited to, oxides, carbonates, sulfates, halides, or any combination or mixture thereof. Illustrative organic salts may also include, but are not limited to, phosphinates, hydrazinium salts, urates, diazonium salts, oxalates, methoxides, tartrates, iminium salts, trolamine salicylate, aluminum monostearate, and/or sorbates. Illustrative alkali metal and/or alkaline earth metals can include, but are not limited to, potassium, magnesium, sodium, calcium, or any combination thereof. Illustrative salts of metal ions can include, but are not limited to, transition metals or heavy metals, such as copper, iron, cadmium, mercury, nickel, vanadium, lead, tungsten, or any combination thereof. The organic and inorganic salts contained in the aqueous mixtures can result from one or more neutralization processes, clarification processes, ion exchange processes, or any combination thereof. For example, the salts contained in the aqueous mixtures can form upon the neutralization of an acidic solution with a suitable alkali compound. Illustrative alkali compounds for the neutralization of an acidic solution can include, but are not limited to, sodium hydroxide, potassium hydroxide, carbonates, or any combination thereof. The organic materials can be of natural or synthetic origin. Illustrative organic materials can include, but are not limited to, proteins, sugars, amino acids, polyols, or any combination thereof. Illustrative organic materials can also include one or more emulsifiers. Emulsifiers can include any chemical additive that facilitates the suspension of one or more liquids in another or prevents the one or more liquids from separating. The contaminants can also include, but are not limited to, heavy metals such as vanadium, nickel, lead, cobalt, mercury, chromium, cadmium, arsenic, selenium, copper, manganese, iron, zinc, or any combination or mixture thereof.

Other contaminants that can be present in the aqueous mixtures can include naturally occurring heavy metals and radioactive materials (NORM) and/or radioactive elements, such as uranium, radon, and the like. The contaminants in the aqueous mixture can also include precipitable metals. Illustrative precipitable metals can include, but are not limited to, iron, calcium, aluminum, or the like.

The contaminants in the aqueous mixture can also include, but are not limited to, compressed gases, oxidizers, enzymes, or any mixture thereof. Illustrative compressed gases can include, but are not limited to, nitrogen, carbon dioxide, air, or any combination thereof. The contaminants in the aqueous mixture can also include, but are not limited to, one or more gels. Illustrative gels can include, but are not limited to, conventional linear gels including cellulose derivatives (carboxymethyl cellulose, hydroxyethyl cellulose, carboxymethyl hydroxyethyl cellulose, hydroxypropyl cellulose, methyl hydroxyl ethyl cellulose), guar or its derivatives (hydroxypropyl guar, carboxymethyl hydroxypropyl guar), or any mixture thereof. The contaminants in the aqueous mixture can also include, but are not limited to, borate-crosslinked fluids, organometallic-crosslinked fluids, aluminum phosphate-ester oil gels, or any combination thereof. Illustrative borate-crosslinked fluids can include, but are not limited to, guar-based fluids crosslinked with boron ions (from aqueous borax/boric acid solution). Illustrative organometallic-crosslinked fluids can include, but are not limited to, zirconium, chromium, antimony, and titanium salts, which can crosslink the guar based gels. The contaminants in the aqueous mixture can further include light hydrocarbons. Illustrative light hydrocarbons, can include, but are not limited to, methane. The contaminants in the aqueous mixture can also include one or more pH modifiers. Illustrative pH modifiers can include acids, bases, and/or pH buffer solutions. Illustrative acids can include, but are not limited to, hydrochloric acid, acetic acid, or any combination thereof. The buffer solutions can include any aqueous solution consisting of a mixture of a weak acid and its conjugate base or a weak base and its conjugate acid. The buffer solutions can include one or more buffer agents. Illustrative buffer agents can include, but are not limited to, citric acid, acetic acid, dipotassium phosphate, or the like, or any combination thereof.

The contaminants in the aqueous mixture can also include radioactive tracers. Illustrative radioactive tracers can include, but are not limited to, antimony-124, bromine-82, iodine-125, iodine-131, iridium-192, scandium-46, manganese-56, sodium-24, technetium-m, silver-m, argon-41, xenon-133, antimony-121, antimony-122, antimony-123, antimony-125, antimony-126, antimony-127, carbon-14, chromium-51, cobalt-57, cobalt-58, cobalt-60, gold-198, iodine-127, iodine-128, iodine-129, iodine-130, iron-59, krypton-85, lanthanum-140, potassium-39 (activated to potassium-40), potassium-41 (activated to potassium-42), potassium-43, rubidium-86, scandium-45, scandium-47, scandium-48, silver-110, sodium-22, strontium-85, strontium-90, tritium, zinc-65, and zirconium-95, or any mixture or combination thereof.

The chemical additives or contaminants that can be present in the aqueous mixture can also include, but are not limited to, 1,2-benzisothiazolin-2-one/1,2-benzisothiazolin-3-one, 1,2,4-trimethylbenzene, 1,4-dioxane, 1-eicosene, 1-hexadecene, 1-octadecene, 1-tetradecene, 2,2-dibromo-3-nitrilopropionamide, 2,2'-azobis-{2-(imidazlin-2-yl)propane}-dihydrochloride, 2,2-dibromomalonamide, 2-acrylamido-2-methylpropane sulphonic acid sodium salt polymer, 2-acrylamido-2-methylpropane sulphonic acid, 2-acryloyloxyethyl(benzyl)dimethylammonium chloride, 2-bromo-2-nitro-1,3-propanediol, 2-butoxy ethanol, 2-dibromo-3-nitriloprionamide (2-monobromo-3-nitriilopropionamide), 2-ethyl hexanol, 2-propanol, 2-propen-1-aminium, N,N-dimethyl-N-2-propenyl-chloride homopolymer, 2-propenoic acid homopolymer ammonium salt, acrylamide/sodium acrylate copolymer, 2-propenoic acid, polymer with sodium phosphinate (1:1), 2-propenoic acid, telomer with sodium hydrogen sulfite, 2-propyn-1-ol/propargyl alcohol, 3,5,7-triaza-1-azoniatricyclo[3.3.1.13,7]decane, 1-(3-chloro-2-propenyl)-chloride, 3-methyl-1-butyn-3-ol, (poly (oxy-1,2-ethanediyl), a-(4-nonylphenyl)-w-hydroxy-, branched), (2-(bis(2-hydroxyethyl)amino)ethanol; 2-hydroxyacetate), acetic anhydride, acetone, acrylamide, (1-propanesulfonic acid, 2-methyl-2-((1-oxo-2-propenyl) amino) monosodium salt, polymer with 2-propenamide), (2-propenoic acid, sodium salt (1:1), polymer with 2-propenamide), acrylamide-sodium acrylate copolymer, alcohols, C10-16, ethoxylated, aliphatic hydrocarbon/hydrotreated light distillate/petroleum distillates/isoparaffinic solvent/paraffin solvent/napthenic solvent, alkenes, alkyl (C14-C16) olefin sulfonate, sodium salt, alkylphenol ethoxylate surfactants, aluminum chloride, amines, C12-C14-tert-alkyl, ethoxylated, amines, ditallow alkyl, ethoxylated, amines, tallow alkyl, ethoxylated, acetates, ammonia, ammonium acetate, ammonium alcohol ether sulfate, ammonium bisulfate, ammonium bisulfite, ammonium chloride, ammonium citrate, ammonium cumene sulfonate, ammonium hydrogen-difluoride, ammonium nitrate, ammonium persulfate/diammonium peroxidisulphate, ammonium thiocyanate, aqueous ammonia, bentonite, benzyl(hydrogenated tallow alkyl) dimethylammonium stearate complex/ organophilic clay, benzene, benzene, 1,1'-oxybis, tetratpropylene derivatives, sulfonated, sodium salts, benzenemethanaminium, N,N-dimethyl-N-[2-[(1-oxo-2-propenyl)oxy]ethyl]-chloride, polymer with 2-propenamide, boric acid, boric oxide/boric anhydride, butan-1-ol, calcium chloride, carbon dioxide, carboxymethylhydroxypropyl guar, cellulase/hemicellulase enzyme, cellulose, chlorine dioxide, citric acid, citrus terpenes, cocamidopropyl betaine, cocamidopropylamine oxide, coco-betaine, copper(ii) sulfate, crissanol A-55, crystalline silica (quartz), cupric chloride dehydrate, decyldimethyl amine, decyl-dimethyl amine oxide, dibromoacetonitrile, diethylbenzene, diethylene glycol, diethylenetriamine penta (methylenephonic acid) sodium salt, diisopropyl naphthalenesulfonic acid, dimethylcocoamine, bis(chloroethyl) ether, diquaternary ammonium salt, dimethyldiallylammonium chloride, dipropylene glycol, disodium ethylene diamine tetra acetate, d-limonene, dodecylbenzene, dodecylbenzene sulfonic acid, dodecylbenzenesulfonate isopropanolamine, d-sorbitol/sorbitol, endo-1,4-beta-mannanase, or hemicellulase, erucic amidopropyl dimethyl betaine, erythorbic acid, anhydrous, ethanaminium, N,N,N-trimethyl-2-[(1-oxo-2-propenyl) oxy]-chloride, homopolymer, ethane-1,2-diol/ethylene glycol, ethoxylated 4-tert-octylphenol, ethoxylated alcohol, ethoxylated alcohol, ethoxylated alcohol (C10-C12), ethoxylated alcohol (C14-C15), ethoxylated alcohol (C9-C11), ethoxylated alcohols, ethoxylated alcohols (C12-C14 secondary), ethoxylated alcohols (C12-C14), ethoxylated branch alcohol, ethoxylated C11 alcohol, ethoxylated castor oil, ethoxylated fatty acid, coco, reaction product with ethanolamine, ethoxylated hexanol, ethoxylated octylphenol, ethoxylated sorbitan monostearate, ethoxylated sorbitan trioleate, ethyl alcohol/ethanol, ethyl benzene, ethyl lactate, ethylene glycol-propylene glycol copolymer (oxirane, methyl-, polymer with oxirane), ethylene oxide, ethyloctynol, exxal 13, fatty acids, fatty acid tall oil reaction products with acetophenone, formaldehyde, and thiourea, fatty alcohol polyglycol ether surfactant, ferric chloride, ferrous sulfate, heptahydrate, formaldehyde, formaldehyde polymer with 4,1,1-dimethylethyl phenolmethyl oxirane, formaldehyde, polymers with branched 4-nonylphenol, ethylene oxide, and propylene oxide, formamide, formic acid, fumaric acid, glassy calcium magnesium phosphate, glutaraldehyde, glycerol/glycerine, guar gum, heavy aromatic petroleum naphtha, hemicellulase, hydrochloric acid/hydrogen chloride/muriatic acid, hydrogen peroxide, hydroxy acetic acid, hydroxyacetic acid ammonium salt, hydroxyethyl cellulose, hydroxylamine hydrochloride, hydroxypropyl guar, isomeric aromatic ammonium salt, isoparaffinic petroleum hydrocarbons, synthetic, isopropanol, isopropylbenzene (cumene), isoquinoline, reaction products with benzyl chloride and quinolone, kerosene, kerosine, hydrodesulfurized, lactose, light aromatic solvent naphtha, light paraffin oil, magnesium silicate hydrate (talc), methanamine, N,N-dimethyl-N-oxide, methanol, methyloxirane polymer with oxirane, mono (nonylphenol) ether, branched, mineral spirits/stoddard solvent, monoethanolamine, N,N,N-trimethyl-2[1-oxo-2-propenyl]oxy ethanaminium chloride, naphtha (petroleum), hydrotreated heavy, naphthalene, naphthalene bis(1-methylethyl), naphthalene, 2-ethoxy-, N-benzyl-alkyl-pyridinium chloride, N-cocoamidopropyl-N,N-dimethyl-N-2-hydroxypropylsulfobetaine, nitrogen (liquid form), nonylphenol polyethoxylate, organophilic clays, petroleum base oils, petroleum naphtha, phosphonic acid, [[phosphonomethyl)imino]bis[2,1-ethanediylnitrilobis (methylene)]]tetrakis-, ammonium salt, pine oil, poly(oxy-1,2-ethanediyl), α-[3,5-dimethyl-1-(2-methylpropyl)hexyl]-ω-hydroxy-, poly(oxy-1,2-ethanediyl), α-hydro-ω-hydroxy/ polyethylene glycol, poly(oxy-1,2-ethanediyl), polyepichlorohydrin, trimethylamine quaternized, polyethylene glycol oleate ester, polymer with 2-propenoic acid and sodium 2-propenoate, polyoxyethylene sorbitan monooleate, polyoxylated fatty amine salt, potassium acetate, potassium borate, potassium borate, potassium borate, potassium carbonate, potassium chloride, potassium formate, potassium hydroxide, potassium metaborate, potassium sorbate, precipitated silica/silica gel, propane-1,2-diol, or propylene glycol, propylene glycol monomethyl ether, quaternary ammonium compounds, quinoline,2-methyl-hydrochloride, quinolinium, 1-(phenylmethl),chloride, silica (dissolved), sodium 1-octanesulfonate, sodium acetate, sodium alpha-olefin sulfonate, sodium benzoate, sodium bicarbonate, sodium bisulfate, sodium bromide, sodium carbonate, sodium chloride, sodium chlorite, sodium chloroacetate, sodium citrate, sodium erythorbate/isoascorbic acid, sodium salt, sodium glycolate, sodium hydroxide, sodium hypochlorite, sodium metaborate $8H_2O$, sodium perborate tetrahydrate, sodium persulfate, sodium polyacrylate, sodium sulfate, sodium tetraborate decahydrate, sodium thiosulfate, sorbitan monooleate, sucrose, sulfamic acid, synthetic amorphous/pyrogenic silica/amorphous silica, tall oil fatty acid diethanolamine, tallow fatty acids sodium salt, tar bases, quinoline derivatives, benzyl chloride-quaternized, terpene and terpenoids, terpene hydrocarbon byproducts, tetrahydro-3,5-dimethyl-2H-1,3,5-thiadiazine-2-thione (a.k.a. dazomet), tetrakis(hydroxymethyl)phosphonium sulfate (THPS), tetramethyl ammonium chloride, tetrasodium ethylenediaminetetraacetate, thioglycolic acid, thiourea, thiourea, polymer with formaldehyde and 1-phenylethanone, toluene, tributyl tetradecyl phosphonium chloride, triethanolamine hydroxyacetate, triethylene glycol, trimethylolpropane, ethoxylated, propoxylated, trisodium ethylenediaminetetraacetate, trisodium nitrilotriacetate, trisodium orthophosphate, urea, vinylidene chloride/methylacrylate copolymer, xylene, aliphatic acids, aliphatic alcohol glycol ether, alkyl aryl polyethoxy ethanol, alkylaryl sulfonate, aromatic hydrocarbons, aromatic ketones, oxyalkylated alkylphenol, petroleum distillate blend, polyethoxylated alkanol, polymeric hydrocarbons, salt of an amine-carbonyl condensate, salt of a fatty acid/polyamine reaction product, sugar, surfactants or blends thereof, or any mixture or combination thereof.

Hydraulic fracturing can include any process or technique used to release hydrocarbons in subterranean formations via the injection of a pressurized fluid (e.g., aqueous mixture and/or brine) into a wellbore to extend or create new channels in the subterranean formation. The aqueous mixture derived from hydraulic fracturing can be or include shale gas water from a waste stream of the hydraulic fracturing. The contaminants contained in the aqueous mixture from hydraulic fracturing can include one or more proppants, which can be added to the pressurized fluid. Proppants can include any solid material, such as treated sand or man-made ceramic materials, designed to keep an induced hydraulic fracture open, during or following the hydraulic fracturing process. Illustrative proppants can include, but are not limited to, grains of sand, ceramic, or any other particulates that prevent the channels in the subterranean formation from closing during the fracturing process. The contaminants contained in the aqueous mixture from hydraulic fracturing can also include gels, foams, and/or compressed gases.

Enhanced oil recovery can include any process to increase the amount of crude oil that can be extracted from an oil field. Contaminants contained in the aqueous mixture from enhanced oil recovery processes can include additives from gas injection, chemical injection, microbial injection, thermal recovery, polymer flooding, surfactant polymer flooding, caustic flooding, or any mixture thereof.

The contaminants from the desalting of crude oil can include brine associated with the crude oil, minerals, clay, silt, and sand from the formation around the wellbore. The contaminants from the desalting can also include one or more metals. Illustrative metals from desalting of crude oil can include, but is not limited to, calcium, zinc, silicon, nickel, sodium, potassium, or any mixture thereof. The contaminants can further contain demulsifying agents, hydrocarbon solvents, corrosion inhibitors, scale inhibitors, metal chelates, wetting agents, or any combination thereof. The contaminants from desalting can further include nitrogen-containing compounds. Illustrative nitrogen-containing compounds can include, but are not limited to, amines used to scrub hydrogen sulfide from refining gas streams, amines used in the neutralizers, or any mixture thereof. The contaminants from desalting can further include iron sulfides and iron oxides, or any mixture thereof.

The concentration of the contaminants in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the contaminants in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the contaminants in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the contaminants in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of the non-crystallizable contaminants in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the non-crystallizable contaminants in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the non-crystallizable contaminants in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the non-crystallizable contaminants in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of the crystallizable contaminants in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the crystallizable contaminants in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the crystallizable contaminants in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the crystallizable contaminants in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of the inorganic salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the inorganic salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the inorganic salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the inorganic salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of the organic salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the organic salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the organic salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the organic salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more sulfate salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the sulfate salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the sulfate salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the sulfate salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more chloride salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the chloride salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the chloride salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the chloride salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more carbonate salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the carbonate salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the carbonate salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the carbonate salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more sodium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the sodium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the sodium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the sodium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more ammonium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the ammonium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the ammonium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the ammonium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more potassium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the potassium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the potassium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the potassium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more nitrate salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the nitrate salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the nitrate salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the nitrate salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more calcium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the calcium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the calcium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the calcium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more magnesium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the magnesium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the magnesium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the magnesium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more manganese salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the manganese salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the manganese salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the manganese salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more barium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the barium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the barium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the barium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

The concentration of any one or more strontium salts in the aqueous mixture can be from a low of about 0.0000001 wt %, about 0.000001 wt %, about 0.0000015 wt %, about 0.000002 wt %, about 0.000005 wt %, about 0.00001 wt %, about 0.00002 wt %, about 0.00005 wt %, about 0.0001 wt %, about 0.0002 wt %, about 0.0005 wt %, about 0.001 wt %, about 0.002 wt %, about 0.005 wt %, about 0.01 wt %, about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 25 wt %, about 30 wt %, about 40 wt %, about 50 wt %, to a high of about 55 wt %, about 60 wt %, about 65 wt %, about 70 wt %, about 75 wt %, about 80 wt %, about 85 wt %, about 90 wt %, about 95% or about 99 wt %. For example, the concentration of the strontium salts in the aqueous mixture can be from about 0.0000001 wt % to about 60 wt %, about 0.000001 to about 50 wt %, about 0.0000015 to about 45 wt %, about 0.000002 wt % to about 40 wt %, about 0.000005 wt % to about 35 wt %, about 0.000005 wt % to about 30 wt %, about 0.00001 wt % to about 20 wt %, about 0.00002 wt % to about 10 wt %, about 0.00005 wt % to about 5 wt %, about 0.0001 wt % to about 2 wt %, about 0.0002 wt % to about 1 wt %, about 0.001 wt % to about 0.5 wt %, about 0.0000001 wt % to about 0.000001 wt %, about 0.0000001 wt % to about 0.00001 wt %, about 0.0000001 wt % to about 0.0001 wt %, about 0.0000001 wt % to about 0.001 wt %, about 0.001 wt % to about 60 wt %, about 0.01 wt % to about 50 wt %, about 0.1 wt % to about 45 wt %, about 0.2 wt % to about 40 wt %, about 0.3 wt % to about 30 wt %, about 0.5 wt % to about 50 wt %, or about 1 wt % to about 50 wt %. In another example, the concentration of the strontium salts in the aqueous mixture can be greater than about 0.0000001 wt %, greater than about 0.000001 wt %, greater than about 0.0000015 wt %, greater than about 0.000002 wt %, greater than about 0.000005 wt %, greater than about 0.00001 wt %, greater than about 0.00002 wt %, greater than about 0.00005 wt %, greater than about 0.0001 wt %, greater than about 0.0002 wt %, greater than about 0.0005 wt %, greater than about 0.001 wt %, greater than about 0.002 wt %, greater than about 0.005 wt %, greater than about 0.01 wt %, greater than about 0.02 wt %, greater than about 0.05 wt %, greater than about 0.1 wt %, greater than about 0.2 wt %, greater than about 0.5 wt %, greater than about 1 wt %, greater than about 2 wt %, greater than about 5 wt %, greater than about 10 wt %, greater than about 20 wt %, or greater than about 50 wt %. In another example, the concentration of the strontium salts in the aqueous mixture can be less than about 0.00001 wt %, less than about 0.0001 wt %, less than about 0.00015 wt %, less than about 0.0002 wt %, less than about 0.0005 wt %, less than about 0.001 wt %, less than about 0.002 wt %, less than about 0.005 wt %, less than about 0.01 wt %, less than about 0.02 wt %, less than about 0.05 wt %, less than about 0.1 wt %, less than about 0.2 wt %, less than about 0.5 wt %, less than about 1 wt %, less than about 2 wt %, less than about 5 wt %, less than about 10 wt %, less than about 20 wt %, less than about 30 wt %, less than about 35 wt %, less than about 40 wt %, less than about 45 wt %, less than about 50 wt %, or less than about 60 wt %.

FIG. 1 depicts a schematic of an illustrative system 100 for separating contaminants from the aqueous mixture, according to one or more embodiments. The system 100 can include a single crystallizer (one is shown 120) or two or more crystallizers arranged in series or parallel (not shown). The system 100 can also include one or more refrigeration systems 130, one or more separators 140, one or more wash columns 160, one or more heat exchangers 105, and one or more filters 180. If the system 100 includes two or more crystallizers 120, each crystallizer 120 can be configured independent from the others, or configured such that any of the one or more refrigeration systems 130, separators 140, wash columns 160, heat exchangers 105, and filters 180 can be shared.

The aqueous mixture derived from the hydrocarbon process can be purified by introducing the aqueous mixture to the crystallizer 120 via line 110. The aqueous mixture can be at least partially crystallized in the crystallizer 120 to provide the crystallized aqueous mixture containing ice, the crystallized contaminant, and the mother liquor.

Figure 2:
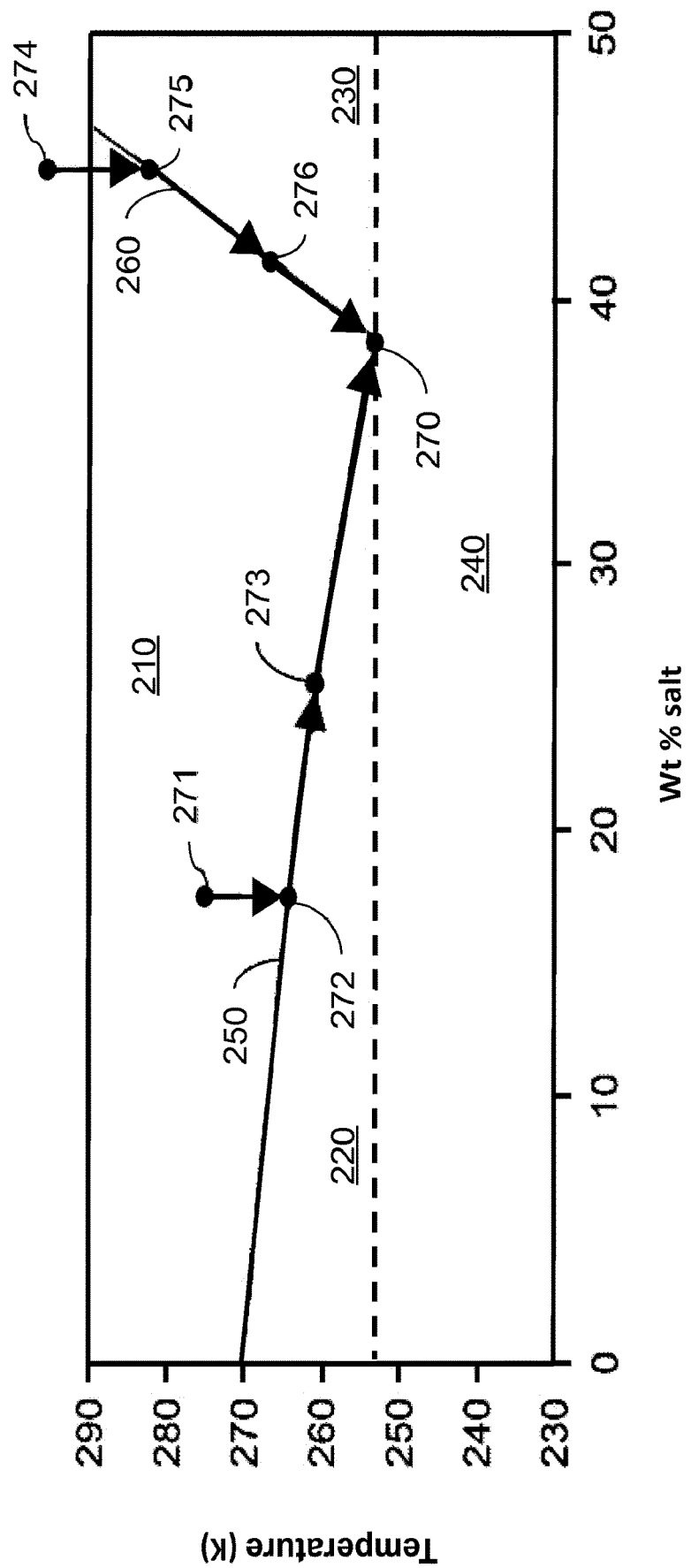
FIG. 2 depicts a phase diagram representing the general principle of crystallizing an aqueous mixture containing contaminants, according to one or more embodiments described.

FIG. 2 depicts a phase diagram representing the general principles of crystallizing the aqueous mixture to the crystallized aqueous mixture, according to one or more embodiments. The aqueous mixture can be a binary mixture including one contaminant or the aqueous mixture can include more than one contaminant. As shown in FIG. 2, the phase diagram can include four distinct regions including a liquid phase 210, two distinct liquid/solid phases 220, 230, and a solid phase 240. The liquid phase 210 can include an unsaturated aqueous mixture containing one or more contaminants dissolved, emulsified, and/or suspended therein. The unsaturated aqueous mixture can include any aqueous mixture having one or more contaminants completely dissolved therein. Said another way, the unsaturated aqueous mixture can include any aqueous mixture where at least one crystallizable contaminant is not crystallized. The first liquid/solid phase 220 can include ice and the unsaturated aqueous mixture containing the contaminants dissolved, emulsified, and/or suspended therein. The second liquid/solid phase 230 can include one or more solidified or crystallized contaminants and a saturated aqueous mixture containing the contaminants dissolved, emulsified, and/or suspended therein. The saturated aqueous mixture can include any aqueous mixture having at least one contaminant both dissolved in the aqueous mixture and solidified or crystallized within the aqueous mixture. Said another way, the saturated aqueous mixture can include any aqueous mixture where one or more contaminant has solidified or crystallized. The solid phase 240 can include ice and one or more crystallized contaminant. The ice and the one or more crystallized contaminants in the solid phase 240 can be physically separated from one another.

The phase diagram can include an ice solubility line 250 and a contaminant solubility line 260. The ice solubility line 250 and the contaminant solubility line 260 can intersect at an equilibrium point 270. The equilibrium point 270 can define, at least in part, an equilibrium temperature for the aqueous mixture and an equilibrium concentration for the contaminants in the aqueous mixture. At the equilibrium point 270, an equilibrium can exist between ice, the crystallized contaminant, and the aqueous mixture. For example, the crystallized aqueous mixture at the equilibrium point 270 can include the crystallized contaminants, ice, and the remaining aqueous mixture or mother liquor. The equilibrium point 270 can depend, at least in part, on the type and/or concentration of contaminants in the aqueous mixture, the number of contaminants in the aqueous mixture, and/or the ions in aqueous mixture. Aqueous mixtures containing a plurality of contaminants can have more than one equilibrium point 270 corresponding to each of the crystallizable contaminants. For example, an aqueous mixture containing a plurality of crystallizable contaminants can have multiple equilibrium points 270 varying over a broad range of temperatures and concentrations. Further, as noted above, the equilibrium point 270 can depend, at least in part, on the concentration of the contaminants in the aqueous mixture. For example, aqueous mixtures containing one or more of the same contaminants at different concentrations can have a different equilibrium points 270.

In at least one embodiment, the concentration of the contaminants in the aqueous mixture can be lower than the equilibrium concentration, indicated by the point at 271. As the aqueous mixture is cooled and the temperature reaches a point 272 on the ice solubility line 250, water can solidify or crystallize. As the water crystallizes, the contaminant concentration in the remaining aqueous mixture can increase, thereby decreasing the freezing point of the aqueous mixture, as indicated by the arrow from point 272 to point 273. From point 273, the mixture can be subjected to continued cooling to reach the equilibrium point 270. Continued cooling of the aqueous mixture can cause the contaminant concentration to reach the equilibrium concentration and can cause the freezing point of the mixture to reach the equilibrium temperature.

In another embodiment, the concentration of the contaminants in the aqueous mixture can be higher than the equilibrium concentration, indicated by the point at 274. As the aqueous mixture is cooled and the temperature reaches a point 275 on the contaminant solubility line 260, the contaminant can crystallize. As the contaminant solidifies, the contaminant concentration in the remaining aqueous mixture can decrease, as indicated by the arrow from point 275 to point 276. From point 276, the aqueous mixture can be subjected to continued cooling to reach the equilibrium point 270. In another embodiment, the concentration of the contaminants in the aqueous mixture can be equal to the equilibrium concentration. Cooling the aqueous mixture with the concentration of the contaminants at the equilibrium concentration below the equilibrium temperature can cause both water and the contaminants to simultaneously solidify or crystallize.

The aqueous mixture can be crystallized below atmospheric pressure, above atmospheric pressure, or at atmospheric pressure. Crystallizing the aqueous mixture above atmospheric pressure can reduce the cooling requirements for the crystallization process. Purification can include the crystallization and separation of one or more contaminants from an aqueous mixture, as discussed and described in *Chem. Eng. Proc.* vol. 37, (1998), p. 207-213.

Referring back to FIG. 1, the crystallizer 120 can cool the aqueous mixture to provide the crystallized aqueous mixture by indirect and/or direct cooling. Direct cooling can include combining an inert cooling fluid from the refrigeration system 130 with the aqueous mixture. As the cooling fluid contacts the aqueous mixture the inert cooling fluid can transfer or exchange thermal energy or heat with the aqueous mixture and subsequently evaporate, thereby cooling the aqueous mixture to provide the crystallized aqueous mixture.

Indirect cooling can include cooling or removing heat from the aqueous mixture without combining the aqueous mixture with the cooling fluid. Indirect cooling can utilize a jacketed or insulated reactor having a heat transfer surface (e.g., wall) disposed therein to separate the cooling fluid from the aqueous mixture (e.g., heat exchanger). The heat transfer surface can absorb or transfer heat to/from the cooling fluid and/or the aqueous mixture. One or more properties of the heat transfer surface can affect the transfer and/or absorption of heat to/from the cooling fluid and the aqueous mixture. For example, the surface area of the heat transfer surface, the heat transfer coefficient of the heat transfer surface, and the like, can either increase or decrease the transfer of heat between the cooling fluid and the aqueous mixture. During indirect cooling, scaling can form about the heat transfer surface. As such, one or more scrapers can be provided to mitigate scale formation on the heat transfer surface.

In at least one embodiment, crystallization via indirect cooling can include a nucleation/ripening process. The nucleation/ripening process can include forming small ice nuclei or crystals in a scraped heat exchanger (e.g., nucleation) and transporting the small ice nuclei to a separate ripening tank maintained at a constant temperature. In the ripening tank, the small crystals can dissolve and larger crystals can subsequently grow (e.g., ripening or crystal growth). Indirect cooling via the nucleation/ripening process can provide impure solid or crystal formation. For example, the small ice nuclei formed in the scraped heat exchanger can adhere to the crystallized contaminants.

Figures 3A, 3B:
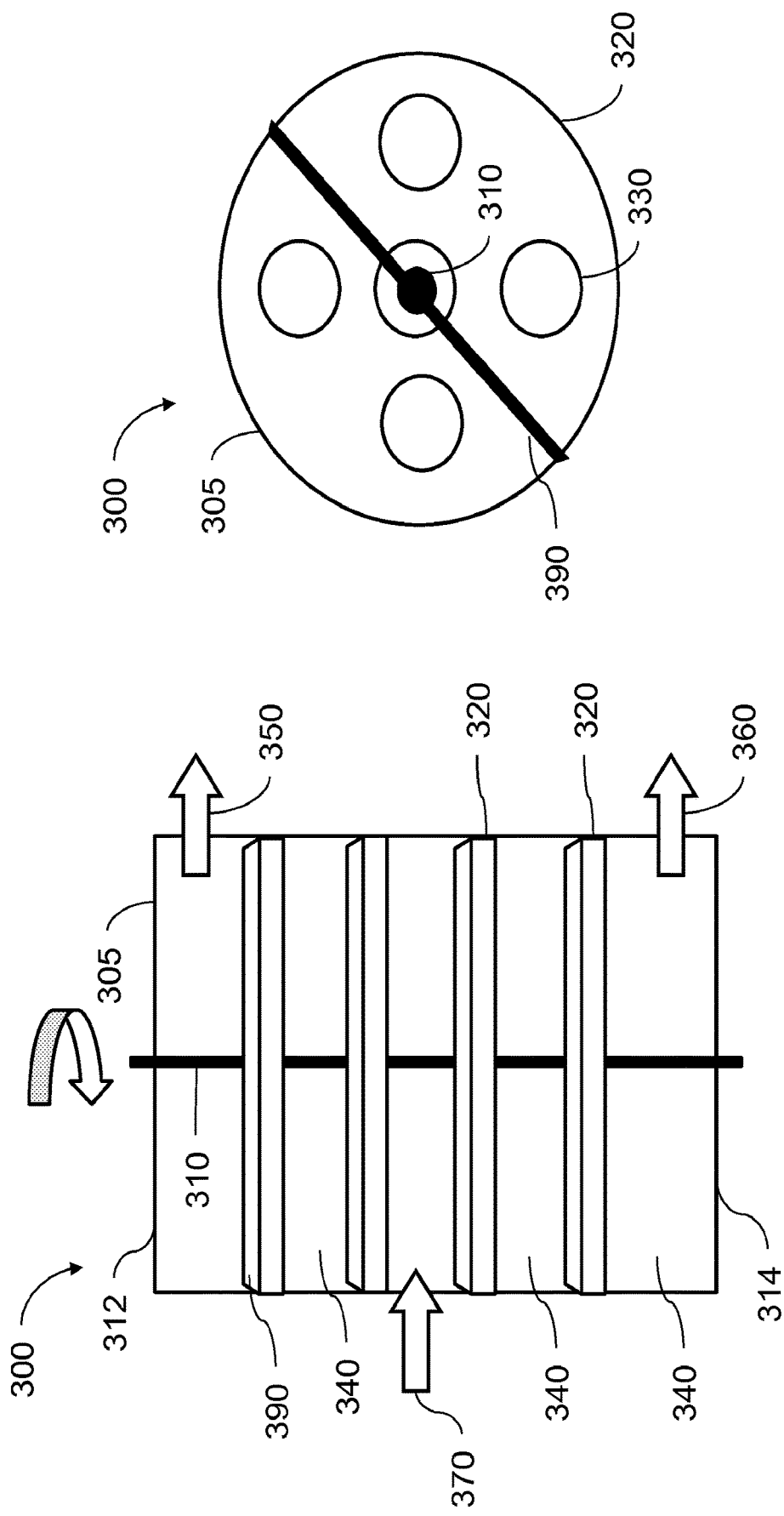
FIG. 3A depicts a front facing view of a cooling disk column crystallizer, according to one or more embodiments described.
FIG. 3B depicts a cross-sectional view of a cooling disk column crystallizer, according to one or more embodiments described.

In another embodiment, crystallization via indirect cooling can include suspension crystallization. Suspension crystallization can include combining the nucleation and ripening of both the aqueous solution and the contaminants of the aqueous mixture in a single vessel. An example of a crystallizer 120 for indirect cooling via suspension crystallization can be or include one or more cooling disk column crystallizers (CDCC) 300. As shown in FIGS. 3A and 3B, the CDCC 300 can include a column or vessel 305 having a shaft 310 extending from a first end or "top" 312 of the column 305 to a second end or "bottom" 314 of the column 305. One or more cooling disks 320 can be disposed within the column 305 and coupled to the shaft 310. A plurality of cooling disks 320 can form or define a plurality of compartments 340 within the column 305. For example, adjacent cooling disks 320 of the plurality of cooling disks 320 can at least partially define a compartment 340 therebetween. A cooling fluid can be provided by the refrigeration system 130 to the cooling disks 320 to provide indirect cooling of the aqueous mixture. As shown in FIG. 3B, the cooling disks 320 of the CDCC 300 can define one or more orifices or holes 330 configured to allow fluid communication therethrough. The holes 330 can also provide communication between the compartments 340. One or more scrapers 390 can be coupled to the shaft 310 and can be adapted to scrape the cooling disks 320 and/or provide mixing within the compartments 340. One or more outlets (two are shown 350, 360) can be disposed about the column 305 and can provide communication to one or more components of the system 100. For example, the outlets 350, 360 can be in communication with the separator 140, the wash column 160, and/or the filter 180. The CDCC 300 can also include one or more inlets (one is shown 370) disposed about the column 305 to receive the aqueous mixture from line 110. The inlets 370 can also be in communication with the wash column 160 and/or the filter 180.

The aqueous mixture can be introduced into the CDCC 300 via the inlet 370. In one or more embodiments, the inlet 370 can be adapted to introduce the aqueous mixture to or near a center (e.g., axial center) of the column 305. For example, the aqueous mixture can be introduced into the CDCC 300 via the inlet 370 disposed between the first end 312 and the second end 314. Heat can be transferred from the aqueous mixture to the cooling fluid via the cooling disks 320 to crystallize the water and/or the crystallizable contaminants in the aqueous mixture. The water and/or the crystallizable contaminants in the aqueous mixture can be crystallized to produce the crystallized aqueous mixture. Due to the difference in the densities of ice (i.e., crystallized water) and the crystallized contaminants, ice can float or travel toward the top 312 of the column 305 via the holes 330 defined in the cooling disks 320 to thereby provide the water-rich fraction, and the crystallized contaminants can sink toward the bottom 314 of the column 305 to thereby provide the contaminant-rich fraction. The water-rich fraction, including ice, at the top 312 of the column 305 can be removed or directed to another component of the system 200 via the outlet 350. The contaminant-rich fraction, including the crystallized contaminants, at the bottom 314 of the column 305 can be removed or directed to another component of the system 100 via the outlet 360. In at least one embodiment, the CDCC 300 and/or the crystallizer 120 can provide or perform both crystallization and separation of the aqueous mixture. Accordingly, if the crystallizer 120 provides both crystallization and separation, the separator 140 may not be required. Additional cooling disks 320 can be provided to increase the surface area of the heat transfer surface available in the CDCC 300 and thereby increase the cooling capacity of the crystallizer 120.

A plurality of crystallizers 120 can be included in the system 100 to increase the output or rate in which the system 100 can operate. An illustrative CDCC 300 can be as discussed and described in *Chem. Eng. Proc.* vol. 37, (1998), p. 207-213. While the CDCC 300 is described herein, the crystallizer 120 can be or include one or more crystallization units known to those of skill in the art. For example, the crystallizer 120 can also include a Scrapped Cooled Wall Crystallizer (SCWC). An illustrative SCWC can be as discussed and described in *Chem. Eng. Res. Des.*, vol. 81 issue 10 (2003), p. 1363-1372. The crystallizer 120 can also include a forced circulation crystallizer, a draft tube baffled crystallizer, a heat exchanger, a GMF™ cooled disk crystallizer, or any combination thereof.

Referring back to FIG. 1, the crystallized aqueous mixture from the crystallizer 120 can be introduced to the separator 140 via line 122. As noted above, the crystallized aqueous mixture can include the water-rich fraction, the contaminant-rich fraction, and the mother liquor. The water-rich fraction and the contaminant-rich fraction can be recovered from the separator 140 for subsequent processing. The crystals or solids in the separated fractions can be suspended in the mother liquor. The separator 140 can be or include any device, system, or combination of devices and/or systems capable of separating or removing the contaminant-rich fraction from the water-rich fraction. For example, the separator 140 can include a device capable of separating the contaminant-rich fraction from the water-rich fraction by their relative density differences. The separator 140 can include a liquid/solid separator, a solid/solid separator, or a combination thereof. Illustrative separators 140 can include, but are not limited to cyclones, decanters, separation vessels, centrifuges, scraped bowl centrifuges, push centrifuges, and/or filters.

The contaminant-rich fraction can have solids or crystals suspended in the mother liquor from a low of about 0.0000001 wt % solids, about 0.000001 wt % solids, about 0.0000015 wt % solids, about 0.000002 wt % solids, about 0.000005 wt % solids, about 0.00001 wt % solids, about 0.00002 wt % solids, about 0.00005 wt % solids, about 0.0001 wt % solids, about 0.0002 wt % solids, about 0.0005 wt % solids, about 0.001 wt % solids, about 0.002 wt % solids, about 0.005 wt % solids, about 0.01 wt % solids, about 0.02 wt % solids, about 0.05 wt % solids, about 0.1 wt % solids, about 0.2 wt % solids, about 0.5 wt % solids, about 1 wt % solids, about 2 wt % solids, about 5 wt % solids, about 10 wt % solids, about 20 wt % solids, about 25 wt % solids, about 30 wt % solids, about 40 wt % solids, about 50 wt % solids, to a high of about 55 wt % solids, about 60 wt % solids, about 65 wt % solids, about 70 wt % solids, about 75 wt % solids, about 80 wt % solids, about 85 wt % solids, about 90 wt % solids, about 95% or about 99 wt % solids, or about 100 wt % solids. For example, the contaminant-rich fraction can have solids or crystals suspended in the mother liquor from about 0.0000001 wt % solids to about 60 wt % solids, about 0.000001 to about 50 wt % solids, about 0.0000015 to about 45 wt % solids, about 0.000002 wt % solids to about 40 wt % solids, about 0.000005 wt % solids to about 35 wt % solids, about 0.000005 wt % solids to about 30 wt % solids, about 0.00001 wt % solids to about 20 wt % solids, about 0.00002 wt % solids to about 10 wt % solids, about 0.00005 wt % solids to about 5 wt % solids, about 0.0001 wt % solids to about 2 wt % solids, about 0.0002 wt % solids to about 1 wt % solids, about 0.001 wt % solids to about 0.5 wt % solids, about 0.0000001 wt % solids to about 0.000001 wt % solids, about 0.0000001 wt % solids to about 0.00001 wt % solids, about 0.0000001 wt % solids to about 0.0001 wt % solids, about 0.0000001 wt % solids to about 0.001 wt % solids, about 0.001 wt % solids to about 60 wt % solids, about 0.01 wt % solids to about 50 wt % solids, about 0.1 wt % solids to about 45 wt % solids, about 0.2 wt % solids to about 40 wt % solids, about 0.3 wt % solids to about 30 wt % solids, about 0.5 wt % solids to about 50 wt % solids, about 1 wt % solids to about 50 wt % solids, about 0.01 wt % solids to about 50 wt % solids, about 0.1 wt % solids to about 45 wt % solids, about 0.2 wt % solids to about 40 wt % solids, about 0.3 wt % solids to about 30 wt % solids, about 0.5 wt % solids to about 50 wt % solids, or about 1 wt % solids to about 50 wt % solids, about 0.001 wt % solids to about 100 wt % solids, about 0.01 wt % solids to about 99 wt % solids, about 0.1 wt % solids to about 95 wt % solids, about 0.2 wt % solids to about 90 wt % solids, or about 0.3 wt % solids to about 90 wt % solids. The contaminant-rich fraction can have solids or crystals suspended in the mother liquor in an amount greater than about 0.0000001 wt % solids, greater than about 0.000001 wt % solids, greater than about 0.0000015 wt % solids, greater than about 0.000002 wt % solids, greater than about 0.000005 wt % solids, greater than about 0.00001 wt % solids, greater than about 0.00002 wt % solids, greater than about 0.00005 wt % solids, greater than about 0.0001 wt % solids, greater than about 0.0002 wt % solids, greater than about 0.0005 wt % solids, greater than about 0.001 wt % solids, greater than about 0.002 wt % solids, greater than about 0.005 wt % solids, greater than about 0.01 wt % solids, greater than about 0.02 wt % solids, greater than about 0.05 wt % solids, greater than about 0.1 wt % solids, greater than about 0.2 wt % solids, greater than about 0.5 wt % solids, greater than about 1 wt % solids, greater than about 2 wt % solids, greater than about 5 wt % solids, greater than about 10 wt % solids, greater than about 20 wt % solids, or greater than about 50 wt % solids. The contaminant-rich fraction can have solids or crystals suspended in the mother liquor in an amount less than about 0.00001 wt % solids, less than about 0.0001 wt % solids, less than about 0.00015 wt % solids, less than about 0.0002 wt % solids, less than about 0.0005 wt % solids, less than about 0.001 wt % solids, less than about 0.002 wt % solids, less than about 0.005 wt % solids, less than about 0.01 wt % solids, less than about 0.02 wt % solids, less than about 0.05 wt % solids, less than about 0.1 wt % solids, less than about 0.2 wt % solids, less than about 0.5 wt % solids, less than about 1 wt % solids, less than about 2 wt % solids, less than about 5 wt % solids, less than about 10 wt % solids, less than about 20 wt % solids, less than about 30 wt % solids, less than about 35 wt % solids, less than about 40 wt % solids, less than about 45 wt % solids, less than about 50 wt % solids, or less than about 100 wt % solids.

The water-rich fraction can have solids or crystals suspended in the mother liquor from a low of about 0 wt % solids, about 0.0000001 wt % solids, about 0.000001 wt % solids, about 0.0000015 wt % solids, about 0.000002 wt % solids, about 0.000005 wt % solids, about 0.00001 wt % solids, about 0.00002 wt % solids, about 0.00005 wt % solids, about 0.0001 wt % solids, about 0.0002 wt % solids, about 0.0005 wt % solids, about 0.001 wt % solids, about 0.002 wt % solids, about 0.005 wt % solids, about 0.01 wt % solids, about 0.02 wt % solids, about 0.05 wt % solids, about 0.1 wt % solids, about 0.2 wt % solids, about 0.5 wt % solids, about 1 wt % solids, about 2 wt % solids, about 5 wt % solids, about 10 wt % solids, about 20 wt % solids, about 25 wt % solids, about 30 wt % solids, about 40 wt % solids, about 50 wt % solids, to a high of about 55 wt % solids, about 60 wt % solids, about 65 wt % solids, about 70 wt % solids, about 75 wt % solids, about 80 wt % solids, about 85 wt % solids, about 90 wt % solids, about 95% or about 99 wt % solids, or about 100 wt % solids. For example, the water-rich fraction can have solids or crystals suspended in the mother liquor from about 0.0000001 wt % solids to about 0.000001 wt % solids, about 0.0000001 wt % solids to about 0.00001 wt % solids, about 0.0000001 wt % solids to about 0.0001 wt % solids, about 0.0000001 wt % solids to about 0.001 wt % solids, about 0.001 wt % solids to about 60 wt % solids, about 0.01 wt % solids to about 50 wt % solids, about 0.1 wt % solids to about 45 wt % solids, about 0.2 wt % solids to about 40 wt % solids, about 0.3 wt % solids to about 30 wt % solids, about 0.5 wt % solids to about 50 wt % solids, or about 1 wt % solids to about 50 wt % solids, about 0.001 wt % solids to about 100 wt % solids, about 0.01 wt % solids to about 99 wt % solids, about 0.1 wt % solids to about 95 wt % solids, about 0.2 wt % solids to about 90 wt % solids, or about 0.3 wt % solids to about 90 wt % solids. In another example, the water-rich fraction can have solids or crystals suspended in the mother liquor from about 0.001 wt % solids to about 60 wt % solids, about 0.01 wt % solids to about 50 wt % solids, about 0.1 wt % solids to about 45 wt % solids, about 0.2 wt % solids to about 40 wt % solids, or about 0.3 wt % solids to about 30 wt % solids. The water-rich fraction can have solids or crystals suspended in the mother liquor in an amount greater than about 0.0000001 wt % solids, greater than about 0.000001 wt % solids, greater than about 0.0000015 wt % solids, greater than about 0.000002 wt % solids, greater than about 0.000005 wt % solids, greater than about 0.00001 wt % solids, greater than about 0.00002 wt % solids, greater than about 0.00005 wt % solids, greater than about 0.0001 wt % solids, greater than about 0.0002 wt % solids, greater than about 0.0005 wt % solids, greater than about 0.001 wt % solids, greater than about 0.002 wt % solids, greater than about 0.005 wt % solids, greater than about 0.01 wt % solids, greater than about 0.02 wt % solids, greater than about 0.05 wt % solids, greater than about 0.1 wt % solids, greater than about 0.2 wt % solids, greater than about 0.5 wt % solids, greater than about 1 wt % solids, greater than about 2 wt % solids, greater than about 5 wt % solids, greater than about 10 wt % solids, greater than about 20 wt % solids, or greater than about 50 wt % solids. The water-rich fraction can have solids or crystals suspended in the mother liquor in an amount less than about 0.00001 wt % solids, less than about 0.0001 wt % solids, less than about 0.00015 wt % solids, less than about 0.0002 wt % solids, less than about 0.0005 wt % solids, less than about 0.001 wt % solids, less than about 0.002 wt % solids, less than about 0.005 wt % solids, less than about 0.01 wt % solids, less than about 0.02 wt % solids, less than about 0.05 wt % solids, less than about 0.1 wt % solids, less than about 0.2 wt % solids, less than about 0.5 wt % solids, less than about 1 wt % solids, less than about 2 wt % solids, less than about 5 wt % solids, less than about 10 wt % solids, less than about 20 wt % solids, less than about 30 wt % solids, less than about 35 wt % solids, less than about 40 wt % solids, less than about 45 wt % solids, less than about 50 wt % solids, or less than about 60 wt % solids.

The contaminant-rich fraction from the separator 140 can be introduced to the filter 180 via line 144, where the crystallized contaminant contained therein can be separated or recovered via line 182 for subsequent processing or analysis. The mother liquor from the contaminant-rich fraction, if present, can be separated or recovered via line 185 and can be recycled back to the crystallizer 120 for subsequent crystallization and separation. In another embodiment, the mother liquor from the contaminant-rich fraction can be recovered and directed to a separate crystallizer (not shown) for subsequent crystallization and separation. The filter 180 can be or include any device, system, or combination of devices and/or systems capable of separating or removing the mother liquor from the contaminant-rich fraction. Illustrative filters 180 can include, but are not limited to belt filters and/or cross flow filters.

The water-rich fraction from the separator 140 can be introduced to the wash column 160 via line 142, where the ice can be washed and/or separated, and recovered via line 164 for subsequent processing or analysis. The ice can be processed (e.g., melted) to provide water. The ice and/or water can be recovered to provide cooling to one or more components of the system 100. For example, as shown in FIG. 1, ice and/or water from the wash column 160 can be recovered via line 162 and directed to the heat exchanger 105 coupled to line 110 to precool the aqueous mixture. The ice and/or water from the wash column 160 can also be recovered and directed to the refrigeration system 130 to cool one or more components therein. The mother liquor, if present, from the water-rich fraction can be recovered via line 165 and can be recycled back to the crystallizer 120 for subsequent crystallization and separation. In at least one embodiment, the mother liquor from the water-rich fraction can be recovered and directed to a separate crystallizer (not shown) for subsequent crystallization.

The mother liquor can be isolated from the crystallized aqueous mixture in the crystallizer 120, the contaminant-rich fraction in the separator 140 or the filter 180, and/or the water-rich fraction in the separator 140 or the wash column 160. The mother liquor can contain any non-crystallized water, non-crystallized contaminant, and/or non-crystallizable contaminant. Recycling the mother liquor via lines 165 and 185 and/or directing the mother liquor to a separate crystallizer for subsequent crystallization can remove and separate the non-crystallized water and/or the non-crystallized contaminants to provide non-crystallizable contaminants and additional water and/or crystallized contaminants. The mother liquor containing one or more non-crystallizable contaminants can be separated or collected via line 190 for subsequent processing.

The refrigeration system 130 can be coupled to the crystallizer 120 via line 132 and configured to maintain the temperature of the crystallizer 120 at or below the equilibrium temperature of the aqueous mixture. The refrigeration system 130 can be or include any device, system, or combination of devices and/or systems capable of maintaining the temperature of the crystallizer 120. For example, the refrigeration system 130 can include a cooling fluid, a compressor, a turbine, an expansion valve, a heat exchanger, or combinations thereof. In at least one embodiment, the cooling fluid can include ammonia, sulfur dioxide, non-halogenated and/or halogenated hydrocarbons, carbon dioxide, or other refrigerants known in the art. The refrigeration system 130 can be or include one or more elements of a Rankine cycle, a derivative of a Rankine cycle, a vapor-compression refrigeration cycle, or combinations thereof. For example, the Rankine cycle can include a turbine and a compressor, which can operate at or near isentropic conditions and the vapor-compression refrigeration cycle can include a compressor and an expansion valve, which can undergo a Joule-Thompson expansion. The refrigeration system 130 can include a one stage refrigeration process or a two stage refrigeration process. Illustrative one and two stage refrigeration processes can be or include those discussed and described in *Chem. Eng. Proc.* vol. 37, (1998), p. 207-213.

The temperature of the refrigeration system 130 can affect one or more processes of the crystallizer 120. For example, the absorption and/or transfer of heat to/from the crystallizer 120 can be driven, at least in part, by a difference in temperature between the cooling fluid and the aqueous mixture. Thus, variations in the temperature can either increase or decrease the rate of cooling, which can determine, at least in part, the surface area requirements for the heat transfer surface in the crystallizer 120. The difference in temperature between the cooling fluid and the aqueous mixture can also affect one or more processes of the crystallizer 120 and/or the system 100. For example, a variation between the temperature of the cooling fluid and the aqueous mixture can result in the formation of scaling on the heat transfer surface. Variations in temperatures can also affect one or more properties of the crystals formed in the crystallizer 120, thereby affecting the crystallization process. For example, the variation in temperature between the cooling fluid and the aqueous mixture can result in variations in the crystal shape, size, composition, or a combination thereof. The variations in the crystal shape and/or size can hinder, impede, prevent, reduce, or otherwise affect the ability of the system 100 to filter or isolate the crystals in one or more processes (e.g., filtration), thereby affecting the purity of the water, crystallized contaminant, and/or the non-crystallizable contaminants.

As noted above, ice and/or water recovered from the wash column 160 can be utilized to cool one or more components of the refrigeration system 130. For example, ice can be used to cool a compressor and/or the cooling fluid of the refrigeration system 130, thereby reducing the energy required to maintain the crystallizer 120 and/or the refrigeration system 130. In at least one embodiment, the refrigeration system 130 can include the two stage refrigeration process and ice produced by the crystallizer 120 can be used to cool the cooling fluid in a condenser of the two stage refrigeration process. Cooling the compressor and/or cooling fluid can reduce the amount of work required to compress the cooling fluid in the refrigeration system 130. In another embodiment, a first portion of ice recovered from the wash column 160 can be used to cool the aqueous mixture in line 110 and a second portion of ice can be used to cool one or more components of the refrigeration system 130.

In at least one embodiment, the amount of ice produced in the crystallizer 120 can determine, at least in part, the fraction of the cooling fluid in the refrigeration system 130 that can be condensed or cooled, and can thus determine, at least in part, a reduction in the energy requirements for operating the system 100. A concentration of the contaminant in the aqueous mixture can also determine, at least in part, the energy required to operate the system 100 and/or the refrigeration system 130. For example, aqueous mixtures containing a low concentration of contaminants can produce a greater quantity of ice and thereby increase the performance of the system 100 by providing an increased ability to recover heat and/or energy. Illustrative examples of using ice from the crystallizer 120 to recover energy and/or heat from the system can include those discussed and described in *Chem. Eng. Proc.* 37, (1998), p. 207-213.

The aqueous mixture can be preconcentrated prior to purification via crystallization and separation. Preconcentration can include any process or technique that increases the concentration of the contaminants in the aqueous mixture. For example, preconcentration can include removing a portion of the water from the aqueous mixture to provide an aqueous mixture having a greater concentration of the contaminants as compared to the aqueous mixture derived from the hydrocarbon process. The aqueous mixture can be preconcentrated by reverse osmosis, evaporative crystallization, filtration, ultrafiltration, or any combination thereof. By using ultrafiltration, for example, suspended solids having a high molecular weight ranging from about $10^3$-$10^6$ Daltons (Da) can be separated from the aqueous mixture. Ultrafiltration can include a process where hydrostatic pressure forces the aqueous mixture against a semipermeable membrane to separate out the high molecular weight solids.

The aqueous mixture can also be analyzed to determine the applicability or efficacy of the purification process for the aqueous mixture prior to freezing. Suitable analysis techniques can include characterization, thermodynamic modeling, prediction of isolable salts, determination of equilibrium temperatures, establishing cooling requirements, the development of a process flowsheet, or any combination thereof.

The aqueous mixture can be characterized by determining the contaminant type and concentration in the aqueous mixture. This can be done by measuring one or more parameters of the aqueous mixture including, but not limited to, conductivity, pH, and/or density. The concentration of the contaminants can be determined, at least in part, by determining the total dissolved solids (TDS) of the aqueous mixture. The TDS can be measured or determined using anion analysis, cation analysis, ammonia and nitrogen analysis, trace element analysis, and alkalinity analysis, or any combination thereof. Ion chromatography can be used to determine the anions present in the aqueous mixture, inductively coupled plasma mass spectroscopy (ICP-MS) or inductively coupled atomic emission spectroscopy (ICP-AES) can be used to determine cation and/or trace elements present. One or more of these analytical techniques can measure the presence and concentration of one or more elements including, but not limited to, aluminum, cadmium, arsenic, cadmium, calcium, cobalt, chromium, copper, iron, mercury, potassium, magnesium, manganese, sodium, lead, nickel, selenium, silicon, strontium, titanium, vanadium, zinc, or the like. The presence of ammonia and nitrogen can be measured or determined using an acid titration process, and/or Kjeldahl digestion. Alkalinity of the aqueous mixture can be measured or determined by Gran titration.

Thermodynamic analysis can include a determination of the thermodynamically predicted solubilities, as well as other relevant crystallization processing parameters for the aqueous mixture containing a plurality of contaminants. For example, thermodynamic analysis can include the determination of the equilibrium temperatures of each contaminant present in the aqueous mixture, the expected yields, and the chemical identity of the most stable forms of the salts formed. Illustrative thermodynamic analysis can be or include those discussed and described in Lewis et al., "Novel Technology for Recovery of Water and Solid Salts from Hypersaline Brines: Eutectic Freeze Crystallization," WRC Report No. 1727/1/10, ISBN 978-1-4312-0006-1 (2010). As described by Lewis et al. (2010) thermodynamic analysis can include one or more thermodynamic modeling software programs, such as MINTEQ and OLI STREAM ANALYZER®. In at least one embodiment, the thermodynamic modeling software can be used to evaluate one or more thermodynamic coefficients including, but not limited to, partial molal Gibbs free energy, partial molal enthalpy, partial molal entropy, partial molal heat capacity, and partial molal volume, or any combination thereof.

In at least one embodiment, anion-cation balancing can be performed on the aqueous mixture before thermodynamic analysis. For example, if the analysis of the aqueous mixture indicates the present of an anion or cation in excess of the other, or if the pH of the aqueous mixture is less than or more than about 7, or neutral, the aqueous mixture can be balanced with the addition of one or more anions or cations.

A process flowsheet can be determined based on one or more crystallization processing parameters determined via thermodynamic analysis. For example, the determination of the contaminants and the predicted temperatures at which the individual contaminants can crystallize can be used in determining the operating temperature of one or more crystallizers 120. The energy requirements for operating the crystallizers 120 can also be determined from the operating temperatures of the crystallizers 120 with one or more software programs, including Aspen Plus 7.1®, which is discussed and described by Lewis et al (2010). The determination of the energy requirements for operating the crystallizers 120 can include an analysis or determination of the heat of formation, Gibbs free energy, solid heat capacity, solid molar volume, or a combination thereof. The energy requirements for operating the crystallizers 120 and/or the operating temperature of the crystallizer 120 can be used to determine the total cooling requirement for the refrigeration system 130 and/or the system 120.

PROPHETIC EXAMPLES

Embodiments discussed and described herein can be further described with the following prophetic examples. Although the simulated examples are directed to specific embodiments, they are not to be viewed as limiting in any specific respect.

For Prophetic Examples 1-3, two hypothetical aqueous mixtures, Case A and Case B, are analyzed to determine the applicability or efficacy of the crystallization process for the hypothetical aqueous mixtures. The analysis includes a characterization of the hypothetical aqueous mixture, thermodynamic modeling, prediction of isolable salts, determination of equilibrium temperatures and cooling requirements, and the development of a process flowsheet. The Case A and Case B aqueous mixtures represent typical or hypothetical aqueous mixtures derived from hydrocarbon production processes containing one or more contaminants and waste hydrocarbons. The Case A and Case B aqueous mixtures illustrate the efficacy of the purification and crystallization process for hypothetical aqueous mixtures having contaminants over a broad range. The Case A and Case B aqueous mixtures also illustrate the applicability of the purification and crystallization process to hypothetical aqueous mixtures containing a broad range of contaminant species.

Prophetic Example 1

In Prophetic Example 1, characterization of the Case A and Case B aqueous mixtures would be performed to determine the impurities present in the hypothetical aqueous mixtures by measuring the pH, density, conductivity, and the total dissolved solids (TDS). The expected results of the characterization for the hypothetical Case A and Case B aqueous mixtures are shown in Table 1.

TABLE 1

| Measurement | Case A | Case B |
|---|---|---|
| pH | 9.8 | 7.28 |
| Conductivity (mS/cm) | 140 | 19.8 |
| Density (g/cm$^3$) | 1.15 | 1.02 |
| TDS (mg/L) | 191,800 | 28,950 |

Cation analysis would also be performed on the two hypothetical aqueous mixtures using ICP-MS/AES, the expected results of which are shown in Table 2.

TABLE 2

| Component | Case A | Case B |
|---|---|---|
| NH$_4$ (mg/L) | 19 | 86 |
| Na (mg/L) | 70,300 | 5,799 |
| Mg (mg/L) | — | 180 |
| Si (mg/L) | 251 | — |
| K (mg/L) | 110 | 3,871 |
| Ca (mg/L) | 5 | 1,048 |

TABLE 2-continued

| Component | Case A | Case B |
|---|---|---|
| Cd (mg/L) | 2 | — |
| Ni (mg/L) | 9 | — |

The cation analysis in Table 2 indicates that the sodium ion is present in the highest concentration in all the cases. Other cations present include calcium and potassium. The combination of the sodium, calcium, and potassium ions comprise more than 97.5% of the cations present in the hypothetical aqueous mixtures.

Anion analysis would be performed on the two typical aqueous mixtures to determine the anionic species present and the concentrations of the anionic species. The expected results of the anion analysis are shown in Table 3.

TABLE 3

| Component | Case A | Case B |
|---|---|---|
| CO$_3$ (mg/L) | 32,821 | — |
| HCO$_3$ (mg/L) | — | 151 |
| PO$_4$ (mg/L) | 475 | 5 |
| SO$_4$ (mg/L) | 37,363 | 15,565 |
| NO$_3$ (mg/L) | 2175 | 741 |
| NO$_2$ (mg/L) | — | — |
| Cl (mg/L) | 46,963 | 1,504 |
| Br | 988 | — |
| F | — | 14 |

The expected results of the anion analysis of the two hypothetical aqueous mixtures indicate a high concentration of sulphate and chloride ions, which comprise over 95% of the total anions present in the hypothetical aqueous mixtures. Case A shows three major anions present, including chloride, sulfate, and carbonate, which comprise over 97% of the anions present. The complete analysis of the hypothetical Case A and Case B aqueous mixtures is summarized below in Table 4.

TABLE 4

| Component | Case A | Case B |
|---|---|---|
| pH | 9.80 | 7.28 |
| Conductivity (mS/cm) | 141 | 19.6 |
| Density (g/cm$^3$) | 1.15 | 1.02 |
| CO$_3$ (mg/L) | 32,821 | — |
| TKN as N (mg/L) | 238 | — |
| NH$_3$(by FSA) (mg/L) | 86 | — |
| NH$_4$(by FSA) (mg/L) | 18 | 86 |
| HCO$_3$ (mg/L) | — | 151 |
| PO$_4$ (mg/L) | 475 | 5 |
| SO$_4$ (mg/L) | 37,363 | 15,565 |
| NO$_3$ (mg/L) | 2,175 | 741 |
| NO$_2$ (mg/L) | — | — |
| Cl (mg/L) | 46,963 | 1,504 |
| Br (mg/L) | 988 | — |
| F (mg/L) | — | 14 |
| Na (mg/L) | 70,297 | 5,796 |
| Mg (mg/L) | — | 170 |
| Si (mg/L) | 251 | — |
| K (mg/L) | 110 | 3,871 |
| Ca (mg/L) | 5 | 1,058 |
| Cd (mg/L) | 2 | — |
| Ni (mg/L) | 9 | — |
| TDS (mg/L) | 191,801 | 28,960 |

Case A, has the broadest range of dissolved species. This hypothetical aqueous mixture is also the most concentrated with a TDS of 191,800 mg/L. Case B, indicates a broad range of dissolved elements at concentrations lower than Case A.

An anion-cation balance analysis would be performed to verify the accuracy of the characterization analysis, the expected results of which are shown in Table 5.

TABLE 5

|  | Case A | Case B |
| --- | --- | --- |
| Cation Charge | 3.062 | 0.423 |
| Anion Charge | −3.259 | −0.382 |
| Imbalance | −0.197 | 0.041 |
| % Imbalance | 3.112 | 5.084 |

Case A and Case B hypothetical aqueous mixtures, as noted above, would include a wide range of contaminants dissolve therein in varying concentrations. It is anticipated that the presence of trace elements would affect the convergence of the modeling and result in extended simulation times. Due to the extended simulation times and because each of the hypothetical aqueous mixtures would include major or dominant ions at concentrations in excess of 98%, subsequent analyses would be limited to the dominant ions present, which are shown below in Table 6 with their corresponding concentrations.

TABLE 6

| Ions | Case A | Case B |
| --- | --- | --- |
| $CO_3$ (mg/L) | 32,821 |  |
| $SO_4$ (mg/L) | 37,363 | 15,565 |
| Cl (mg/L) | 46,963 | 1,504 |
| $NO_3$ (mg/L) |  | 741 |
| Na (mg/L) | 70,297 | 5,796 |
| K (mg/L) |  | 3,871 |
| Ca (mg/L) |  | 1,058 |

As shown in Table 6, three ions are common in the hypothetical aqueous mixtures of Case A and Case B, including sodium, chlorine, and sulfate. An ion balancing would be carried out with respect to these dominant ionic species to ensure that a minimum imbalance is not exceeded.

Prophetic Example 2

In Prophetic Example 2, thermodynamic analysis of the hypothetical Case A and Case B aqueous mixtures from Prophetic Example 1 is performed with modeling software, OLI STREAM ANALYZER®, to analyze the temperature of the ion balanced aqueous mixtures. The temperature analysis would be carried out from 25° C. to −25° C. The modeling software would use chemical and phase equilibria to predict the contaminants that would crystallize and the order in which the contaminant would crystallize, the temperature at which crystallization would occur, and the yield of each contaminant and ice that would result from the crystallization. One (1) liter of each of the hypothetical aqueous mixtures is used for the temperature analysis.

Figure 4:
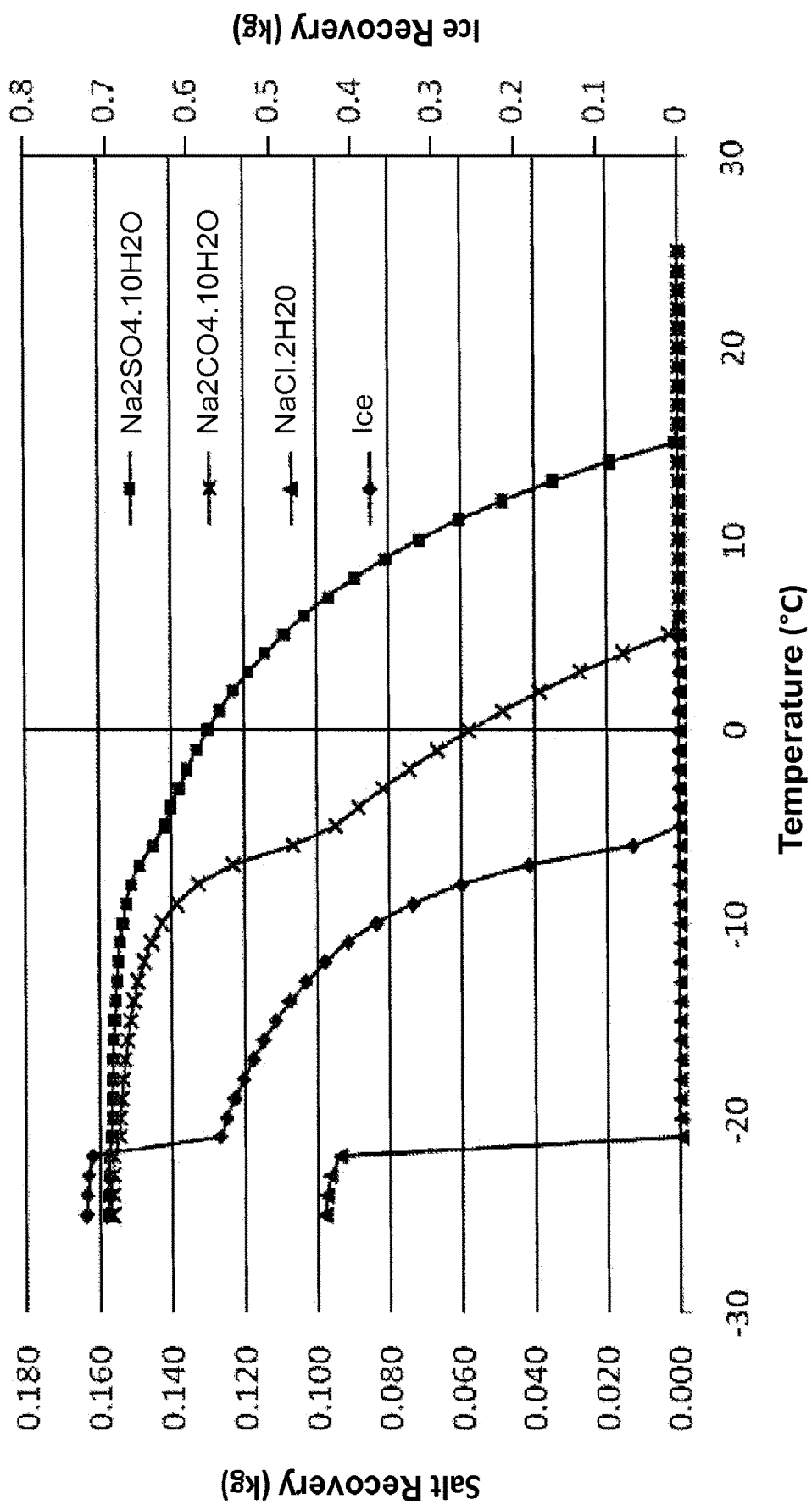
FIG. 4 is a plot of a simulated example showing the recovery of various contaminants from an aqueous mixture as a function of temperature.

The expected results of the temperature analysis for Case A is shown in the plot in FIG. 4. As shown in FIG. 4, the primary y-axis indicates the recovery of contaminants (kg) with respect to temperature, and the secondary y-axis indicates the recovery of ice (kg) with respect to temperature. From these results, it would be evident that the first species that is predicted to crystallize would be $Na_2SO_4.10H_2O$ (Glauber salt) at about 15° C., followed by $Na_2CO_3.10H_2O$ (washing soda) at about 5° C. The high concentration of the contaminant in the hypothetical aqueous mixtures would result in the crystallization of the contaminant before the crystallization of the water to ice. The crystallization of the contaminant, in this case, would cause the aqueous mixture to approach the salt or contaminant solubility line first. Further, it would be expected that the high concentrations of ions present in the aqueous mixture would decrease the freezing point of water from about 0° C. to about −5° C. The expected increase in the concentration of $Na_2SO_4.10H_2O$ and $Na_2CO_3.10H_2O$ would be observed as ice begins to form. The last contaminant to crystallize would be $NaCl.2H_2O$, which would crystallizes at −23° C.

The expected thermodynamic analysis for Case A is shown below in Table 7, which summarizes the expected temperatures in which the contaminants would first crystallize along with the expected amount of the contaminant that would be recovered at −25° C.

TABLE 7

| Product | Molar Mass | Crystallizing Temperature (° C.) | Amount at −25° C. (mol) | Amount at −25° C. (kg) |
| --- | --- | --- | --- | --- |
| $Na_2SO_4 \cdot 10H_2O$ | 322.20 | 15 | 0.49 | 0.16 |
| $Na_2CO_3 \cdot 10H_2O$ | 286.14 | 5 | 0.55 | 0.16 |
| Ice | 18.02 | −5 | 40.34 | 0.73 |
| $NaCl \cdot 2H_2O$ | 94.47 | −23 | 1.04 | 0.10 |

Figure 5:
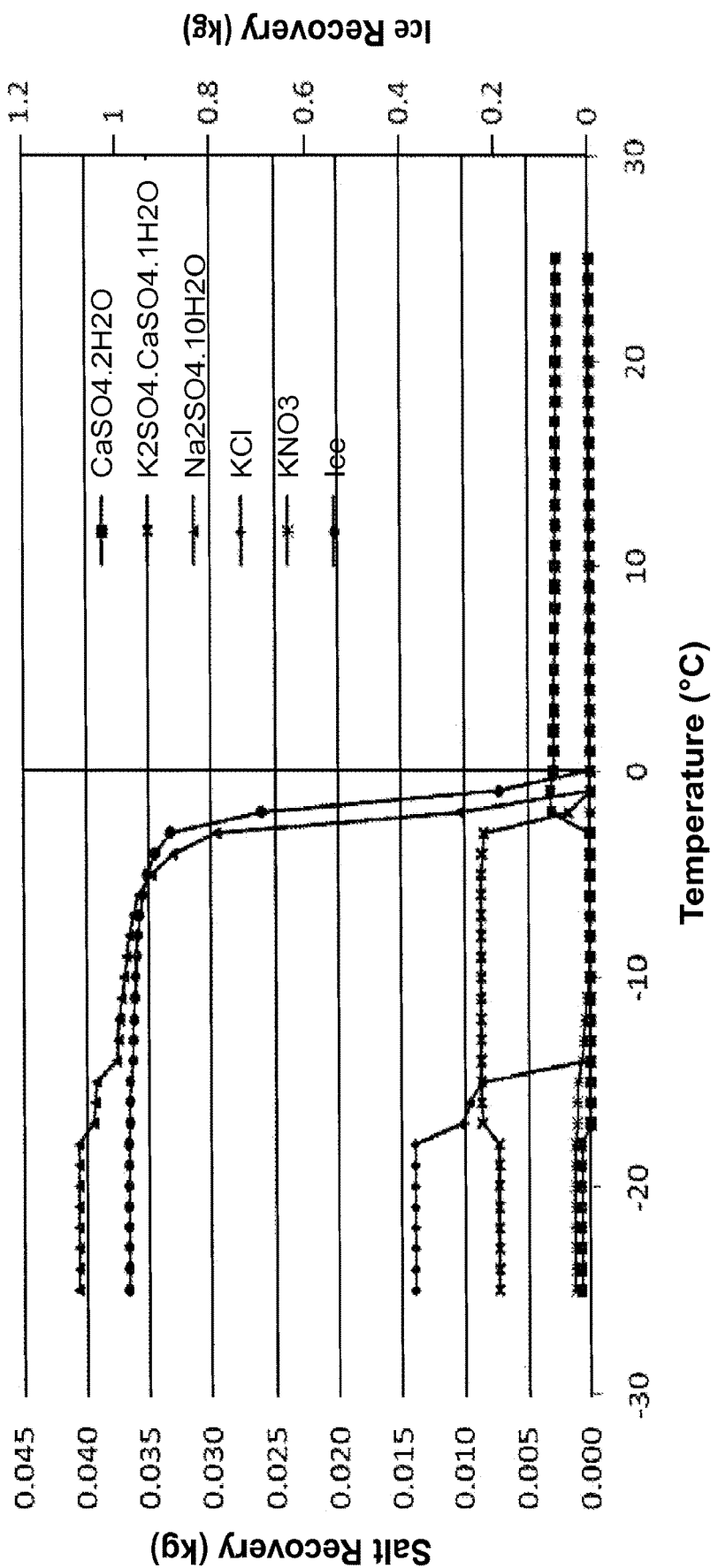
FIG. 5 is a plot of another simulated example showing the recovery of various contaminants from an aqueous mixture as a function of temperature.

The expected results of the temperature analysis for Case B is shown in the plot in FIG. 5. As shown in FIG. 5, the primary y-axis indicates the recovery of contaminants (kg) with respect to temperature, and the secondary y-axis indicates the recovery of ice (kg) with respect to temperature. FIG. 5 indicates a saturated aqueous mixture with respect to calcium sulphate at about 25° C. and further indicates that the first component to crystallize would be ice at about −1° C. A further reduction in the temperature to about −2° C. would result in the formation of $K_2SO_4 \cdot CaSO_4 \cdot H_2O$ as opposed to $CaSO_4.2H_2O$. The reduction in temperature would also result in the crystallization of $Na_2SO_4.10H_2O$. Reducing the temperature to −10° C. would result in the crystallization of $KNO_3$. The final salt to crystallize would be KCl at a temperature of about −15° C. The thermodynamic analysis for Case B is shown below in Table 8, which summarizes the temperatures in which the contaminants would crystallize along with the amount of the contaminant that would be recovered at −25° C.

TABLE 8

| Product | Molar Mass | Crystallizing Temperature (° C.) | Amount at −25° C. (mol) | Amount at −25° C. (kg) |
| --- | --- | --- | --- | --- |
| $CaSO_4 \cdot 2H_2O$ | 172.17 | present | 0.00 | 0.00 |
| Ice | 18.02 | −1 | 54.22 | 0.98 |
| $Na_2SO_4 \cdot 10H_2O$ | 322.20 | −2 | 0.13 | 0.04 |
| $K_2SO_4 \cdot CaSO_4$ | 328.42 | −2 | 0.02 | 0.01 |
| $KNO_3$ | 101 | −10 | 0.01 | 0.00 |
| KCl | 74.55 | −15 | 0.04 | 0.00 |

Prophetic Example 3

Figure 6:
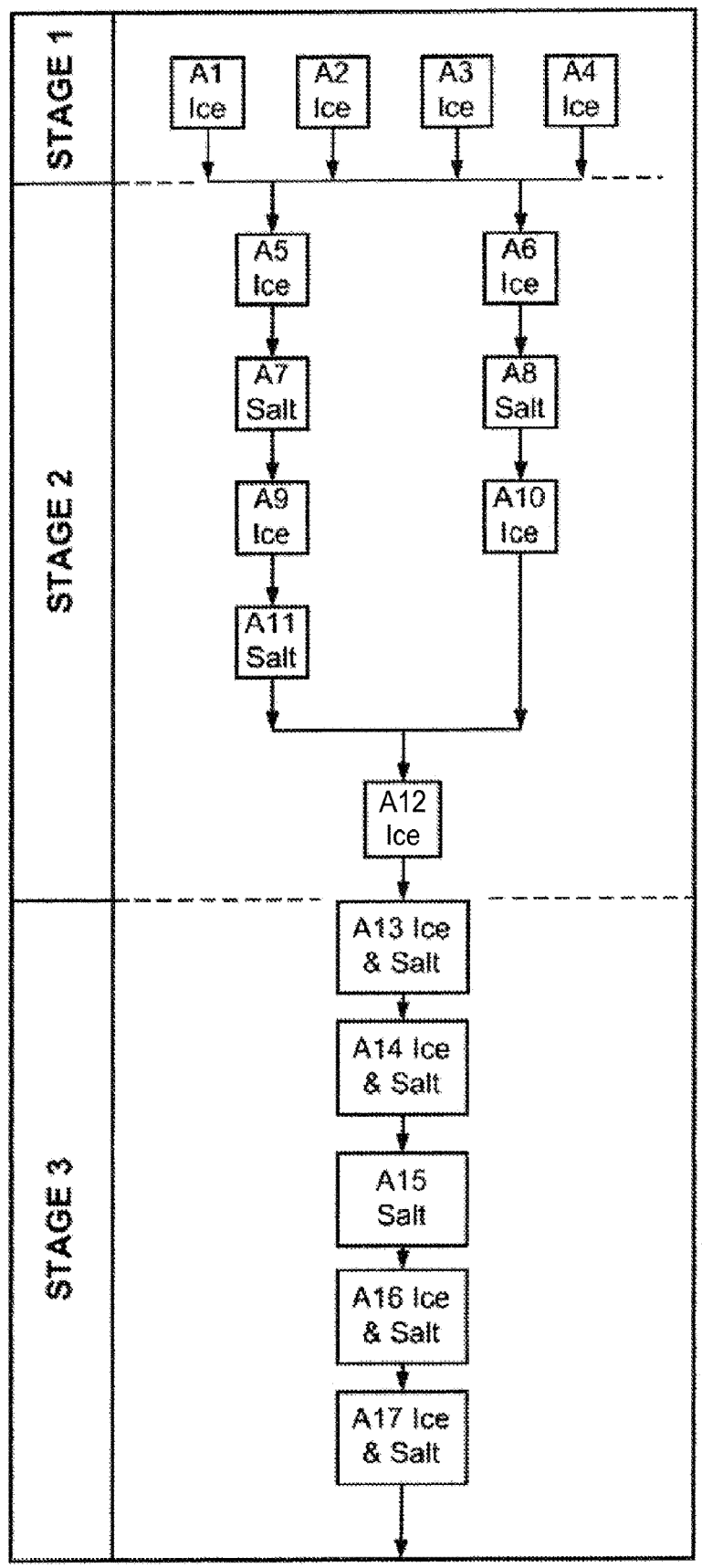
FIG. 6 is a schematic of a simulated example showing the cascading concentration procedure.

In Prophetic Example 3 a separation procedure is performed to investigate the use of the purification and crystallization process as a method for the treatment of a typical or hypothetical aqueous mixture derived from a hydrocarbon production process containing two or more typical contaminants. FIG. 6 shows a cascading concentration procedure, which would be employed during these experiments. The blocks show the experiment number as well as the identity of the contaminant contents from each experiment. This approach would be adopted because a working volume of the same concentration as that obtained from the cascading concentration procedure would not be achieved with a single 1.5 L crystallizer.

The hypothetical aqueous mixtures would be prepared by measuring the pH of the aqueous mixtures on site since the pH of the aqueous mixtures can change within 24 h. The conductivity and ion analyses would be conducted upon arrival at the laboratory, which is expected to takes less than a week. The cation and anion concentrations would be measured using Inductively Coupled Plasma Mass Spectrometry (ICP-MS). The experiments would be performed in a 1.5 L jacketed glass reactor. A Testo 175-177 temperature logging device would be used to measure the solution temperature of the reactor. A stirrer with variable speed control would be used to provide adequate mixing with a 4-blade impeller at 250 rpm. Cooling would be achieved with a Lauda RE207 thermostatic unit that continuously circulates the coolant, Kry040, through the jacket of the reactor. The setup, excluding a thermostatic unit, would be kept in a freeze room at different operating conditions depending on the stage of the cascading concentration procedure shown in FIG. 6.

Filtration of the final products would be conducted in the cold room maintained at the same set-point temperature as the thermostatic unit. A Buchner funnel coupled to a 1 L filtration flask would be used to filter the ice. A 300 mL Millipore All-Glass filter holder connected to a vacuum pump would be used to filter the contaminants for experiments that produce contaminants. The pore size of the filter paper would be 0.45 μm.

Each experiment, from A1 to A4 in FIG. 6, would be initiated by adding approximately 1250 g of the hypothetical aqueous mixture that has been previously maintained at −22° C. to the crystallizer. Thus, the total feed to the system would be about 5000 g. The thermostatic unit and set-point of the freeze room would be set to the same temperature and simultaneously adjusted depending on the stage of the cascading concentration procedure. These values are typically 1° C. below the expected crystallizing temperature of the ice. For example, in the initial stream, ice would be expected to form at about −0.5° C., thus the thermostatic unit and freeze room would be set at about −1.5° C. The data logging of temperature and conductivity measurements would be initiated upon addition of the hypothetical aqueous mixture to the crystallizer. The contents of the reactor would be removed and placed in a 3 L beaker and kept in the freeze room. The ice and crystallized contaminant would be left to stand in the beaker and allowed to separate for ±10 min. After the separation, the ice and its entrained solution would be carefully separated from the crystallized contaminant and its solution into separate beakers. The ice would be vacuum filtered using a Buchner Funnel while the now saturated solution containing the contaminant would be filtered with the 300 mL Millipore setup. Finally, the ice would be washed with 50 mL deionized water which is pre-cooled and kept in the freeze room at the same conditions as the experiment. Liquid samples of the solution, ice (after various washes), the filtrate from the ice washing step and concentrated brine filtrate would be withdrawn and analyzed using ICP-MS to determine the concentration of the various cations and anions present. If salt is formed during an experiment it would be dissolved in deionized water and sent for ICP-MS analysis.

Prophetic Example 4

In Prophetic Example 4, a hypothetical aqueous mixture, Case C, is processed and analyzed to determine the feasibility, applicability, and/or efficacy of the crystallization process for the removal or separation of dissolved inorganic contaminants (e.g., inorganic salts) contained in the hypothetical aqueous mixture. The Case C aqueous mixture represents a typical or hypothetical aqueous mixture from a hydrocarbon production process, such as hydraulic fracturing, which would contain one or more inorganic contaminants. The Case C aqueous mixture is prepared by combining an aqueous solution with varying concentrations of salt compounds that simulate typical inorganic contaminants. The expected composition and concentration of the inorganic contaminants or salt compounds in the hypothetical aqueous mixture are shown in Table 9.

TABLE 9

| Case C | |
| --- | --- |
| Contaminants | Concentration (ppm) |
| Calcium | 23,000 |
| Magnesium | 1,800 |
| Manganese | 10 |
| Potassium | 300 |
| Strontium | 7000 |
| Barium | 15,000 |
| Sodium | 50,000 |
| Trace Elements | 10-20 |

A saturated wash-solution would be prepared for washing the contaminants. The saturated wash-solution would be either sodium chloride (NaCl) or barium chloride ($BaCl_2$). A solution of ultra-pure water would be cooled in an ice-bath. A 1 liter (L) plastic beaker, which simulates the crystallizer, would be filled with approximately 900 mL of the Case C aqueous mixture. A stirrer or stir bar would be provided in the 1 L plastic beaker to stir the Case C aqueous mixture. The 1 L plastic beaker would be covered and insulated with insulating material. A temperature sensor would be placed in the plastic beaker and the temperature would be measured and recorded via a computer operatively coupled to the temperature sensor. The 1 L plastic beaker would then be cooled until the eutectic temperature (approximately −23.4° C.) is reached. The 1 L plastic beaker would then be maintained at or near the eutectic temperature to prevent excessive ice formation or crystallization of the water. The walls of the 1 L plastic beaker would be scraped with a spatula at regular intervals to remove layers of the ice and crystallized salt formed thereabout. When sufficient amounts of the ice and the crystallized salt are formed, the stirrer and the temperature sensor would be removed to allow the ice and the crystallized salt to separate gravimetrically.

The ice would be removed from the top portion of the 1 L plastic beaker and collected in a glass beaker cooled with ice. The ice collected in the glass beaker would be vacuum filtered to remove any liquids combined or associated with the ice, and samples of the remaining ice and the filtrate would be taken for subsequent analysis. The remaining ice would then be washed and vacuum filtered by combining the solution of ultra-pure water with the remaining ice and vacuum filtering the aqueous mixture. The process of washing and vacuum filtering would be repeated until a desired number of washing and vacuum filtering cycles is achieved. For Prophetic Example 4, a total of five washing and vacuum filtering cycles are performed. After each of the washing and vacuum filtering cycles, samples of the ice after vacuum filtration and the filtrate resulting from the vacuum filtration would be collected. All the samples of the ice and the filtrate would be analyzed using ICP-AES.

The crystallized salt would be collected from the bottom of the 1 L plastic beaker and vacuum filtered to remove any liquids combined or associated with the crystallized salt, and samples of the remaining crystallized salt and the filtrate would be taken for subsequent analysis. The remaining crystallized salt would then be washed and vacuum filtered by combining the saturated wash-solution with the remaining crystallized salt and vacuum filtering the mixture. The process of washing and vacuum filtering would be repeated until a desired number of washing and vacuum filtering cycles is achieved. For Prophetic Example 4, a total of five washing and vacuum filtering cycles are performed. After each of the washing and vacuum filtering cycles, samples of the crystallized salt after vacuum filtration and the filtrate resulting from the vacuum filtration would be collected. All the samples of the crystallized salt and the filtrate would be analyzed using ICP-AES.

Figure 7:
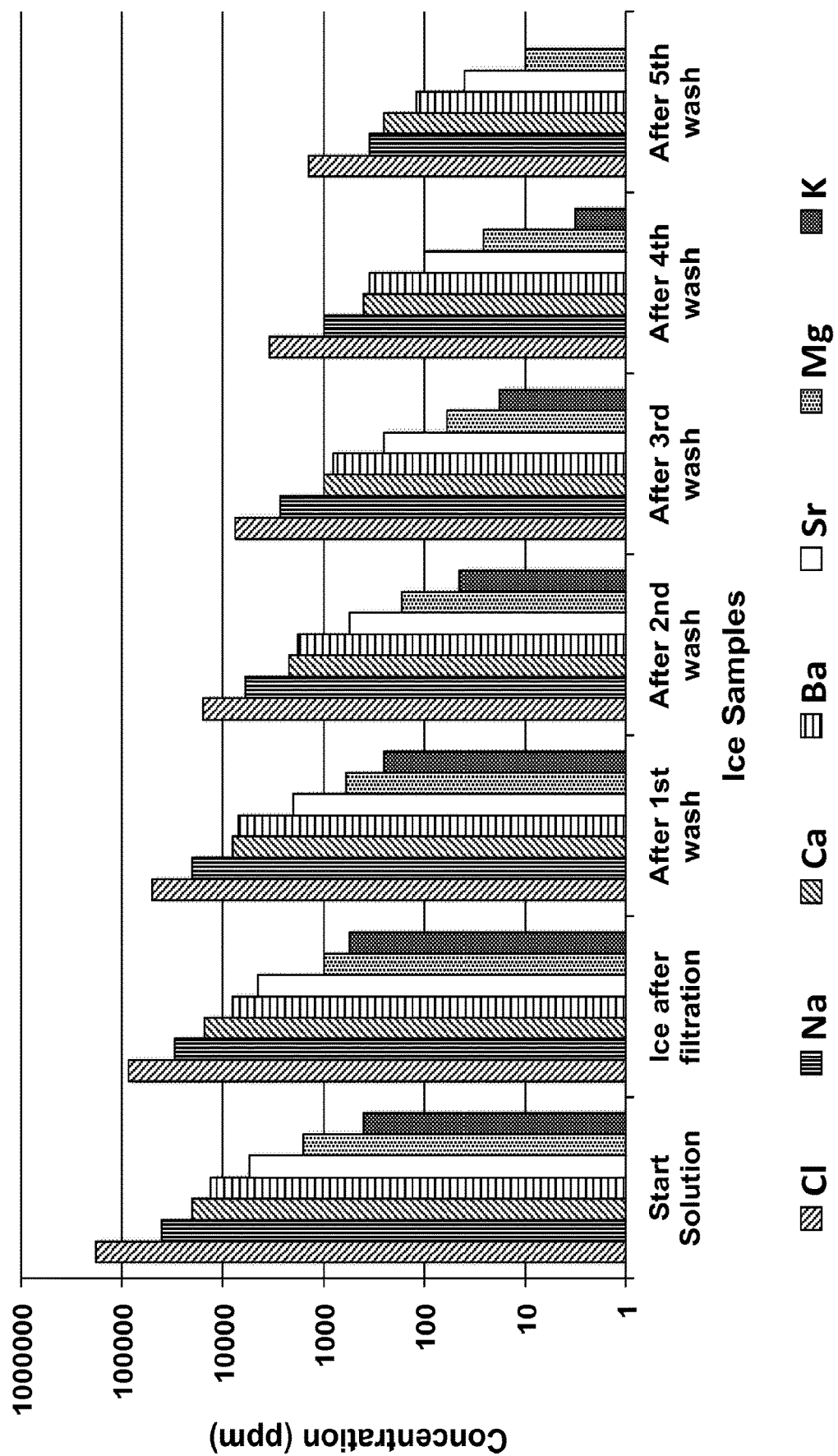
FIG. 7 is a plot of a simulated example showing a concentration of inorganic contaminants contained in ice collected from an aqueous mixture as a function of the number of washing and vacuum filtering cycles performed.

The expected results of the ICP-AES analysis for the samples of the ice collected from the glass beaker (Start Solution) and the samples of the ice after each of the five washing and vacuum filtering cycles are shown in the plot in FIG. 7. As shown in FIG. 7, the y-axis is a logarithmic scale of the concentration (ppm) of each of the salts or inorganic contaminants contained in the samples of ice as a function of the number of washing and vacuum filtering cycles performed. FIG. 7 indicates that the concentration of the inorganic contaminants would decrease with each washing and vacuum filtering cycle. Accordingly, the purity of the ice would increase with each washing and vacuum filtering cycle. As indicated above in Table 9, additional inorganic contaminants (trace elements) are added to the hypothetical aqueous mixture in trace amounts (between 10-20 ppm). The trace elements is expected to be successfully removed from the samples of the ice by the washing and filtering cycles.

Figure 8:
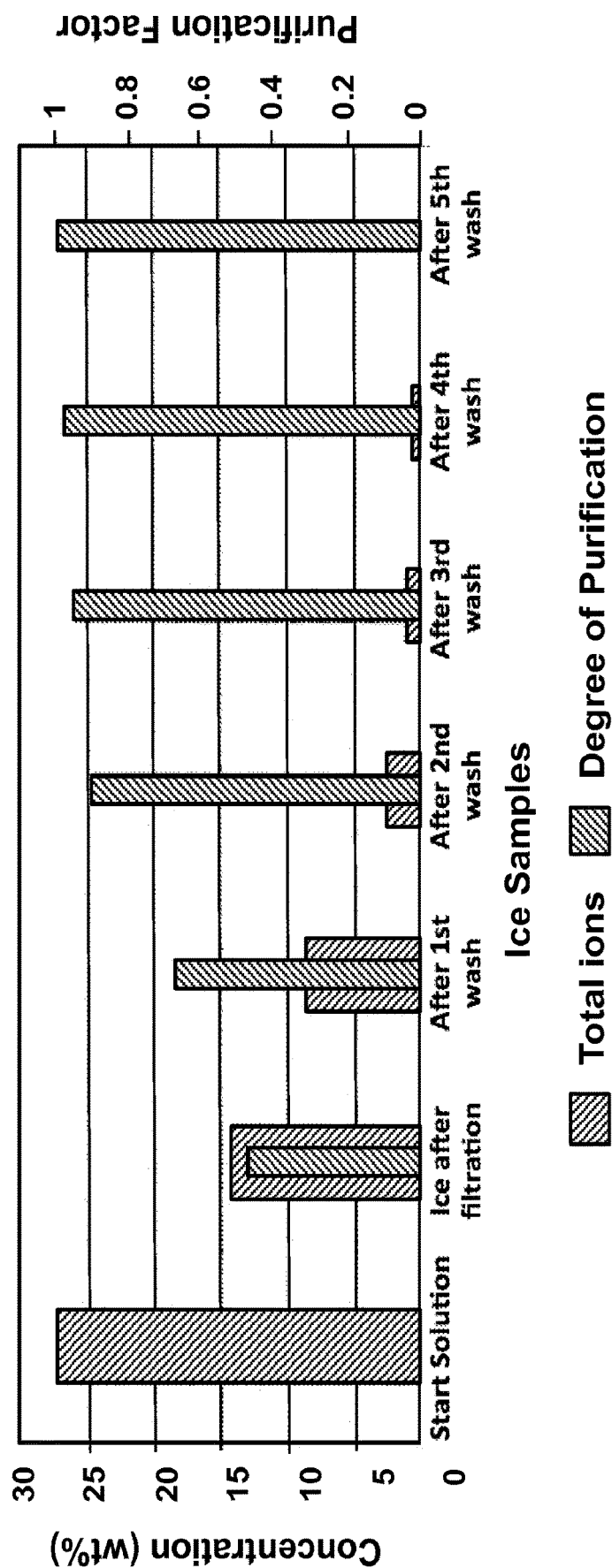
FIG. 8 is a plot of a simulated example showing a degree of purification and a total concentration of inorganic con-

FIG. 8 shows the expected total ion concentration and purity (i.e., purification factor) of the ice collected from the glass beaker (Start Solution) and the samples of the ice after each of the five washing and vacuum filtering cycles. As shown in the FIG. 8, the primary y-axis indicates the total concentration (wt %) of the inorganic contaminants contained in the each of the samples as a function of the number of washing and vacuum filtering cycles, and the secondary y-axis indicates the degree of purification or purification factor for each of the samples as a function of the number of washing and vacuum filtering cycles. FIG. 8 indicates that a high degree of purity (purification factor>0.99) would be achieved after five washing and vacuum filtering cycles. FIGS. 7 and 8 indicate that there would be no significant incorporation of the inorganic contaminants in the ice during the formation of the ice. FIGS. 7 and 8 also indicate that the purity of the ice is expected to be determined or dictated by the efficiency of the washing and vacuum filtering cycles.

Embodiments of the present disclosure further relate to any one or more of the following paragraphs:

1. A method for purifying an aqueous mixture, comprising: at least partially crystallizing an aqueous mixture derived from a hydrocarbon process to provide a crystallized aqueous mixture, wherein the aqueous mixture comprises water and one or more contaminants to be separated from the water; separating the crystallized aqueous mixture into a contaminant-rich fraction and a water-rich fraction; recovering water from the water-rich fraction; and recovering the one or more contaminants from the contaminant-rich fraction.

2. The method according to paragraph 1, further comprising preconcentrating the aqueous mixture before at least partially crystallizing the aqueous mixture to provide the crystallized aqueous mixture.

3. The method according to paragraph 2, wherein preconcentrating the aqueous mixture comprises subjecting the aqueous mixture to reverse osmosis, coagulation, thermal oxidation, ultrafiltration, or any combination thereof.

4. The method according to any one of paragraphs 1 to 3, wherein the aqueous mixture is derived from hydraulic fracturing.

5. The method according to any one of paragraphs 1 to 4, wherein the aqueous mixture is derived from enhanced oil recovery.

6. The method according to any one of paragraphs 1 to 5, wherein the aqueous mixture is derived from desalting of crude oil.

7. The method according to any one of paragraphs 1 to 6, wherein the aqueous mixture is derived from isolation of hydrocarbons from oil tar sands.

8. The method according to any one of paragraphs 1 to 7, further comprising characterizing the aqueous mixture to determine the one or more contaminants present therein, wherein characterizing the aqueous mixture comprises determining a conductivity of the aqueous mixture, a pH of the aqueous mixture, a density of the aqueous mixture, or a combination thereof.

9. The method according to any one of paragraphs 1 to 8, wherein at least partially crystallizing the aqueous mixture to provide the crystallized aqueous mixture comprises introducing the aqueous mixture to a cooling disk column crystallizer.

10. The method according to paragraph 9, wherein the contaminant-rich fraction and the water-rich fraction in the cooling disk column crystallizer are separated by density.

11. The method according to any one of paragraphs 1 to 10, wherein recovering the one or more contaminants from the contaminant-rich fraction comprises separating the one or more contaminants by filtration.

12. The method according to any one of paragraphs 1 to 11, further comprising recovering a mother liquor from the contaminant-rich fraction and the water-rich fraction.

13. The method according to paragraph 12, further comprising recovering a non-crystallizable contaminant from the mother liquor.

14. A method for purifying an aqueous mixture, comprising: characterizing an aqueous mixture derived from a hydrocarbon process to determine one or more contaminants present therein, wherein characterizing the aqueous mixture comprises determining a conductivity of the aqueous mixture, a pH of the aqueous mixture, a density of the aqueous mixture, or a combination thereof; at least partially crystallizing the aqueous mixture to provide a crystallized aqueous mixture; separating the crystallized aqueous mixture into a contaminant-rich fraction and a water-rich fraction; recovering water from the water-rich fraction; and recovering the one or more contaminants from the contaminant-rich fraction.

15. The method according to paragraph 14, further comprising preconcentrating the aqueous mixture before at least partially crystallizing the aqueous mixture to provide the crystallized aqueous mixture, wherein preconcentrating the aqueous mixture comprises subjecting the aqueous mixture to reverse osmosis, coagulation, thermal oxidation, ultrafiltration, or any combination thereof.

16. The method according to paragraph 14 or 15, wherein the aqueous mixture is derived from hydraulic fracturing, enhanced oil recovery, desalting of crude oil, isolation of hydrocarbons from oil tar sands, or a combination thereof.

17. A system for purifying an aqueous mixture, comprising: a crystallizer coupled to a refrigeration system, wherein the crystallizer is adapted to at least partially crystallize an aqueous mixture derived from a hydrocarbon process to provide a crystallized aqueous mixture, and wherein the aqueous mixture comprises water and one or more contaminants to be separated from the water; a feed line coupled to the crystallizer for introducing the aqueous mixture thereto; a separator for separating the crystallized aqueous mixture into a contaminant-rich fraction and a water-rich fraction; a wash column coupled to the separator and adapted to recover water from the water-rich fraction; and a filter coupled to the separator and adapted to recover the one or more contaminants from the contaminant-rich fraction.

18. The system according to paragraph 17, further comprising a heat exchanger coupled to the feed line and adapted to receive thermal energy from the aqueous mixture in the feed line and transfer the thermal energy to the water from the wash column.

19. The system according to paragraph 17 or 18, wherein the water from the wash column is used to cool the refrigeration system.

20. The system according to any one paragraphs 17 to 19, further comprising a second crystallizer, wherein the second crystallizer is adapted to at least partially crystallize a mother liquor from the crystallize aqueous mixture.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for purifying an aqueous mixture derived from a hydrocarbon process, comprising:
    deriving a hydrocarbon process stream comprising water, hydrocarbon and one or more contaminants from a hydrocarbon process;
    at least partially crystallizing an aqueous mixture consisting of the hydrocarbon process stream derived from the hydrocarbon process by cooling the aqueous mixture to at least one eutectic temperature of the aqueous mixture to provide an at least partially crystallized aqueous mixture that comprises a mother liquor, ice, the hydrocarbon, and the one or more contaminants;
    separating the at least partially crystallized aqueous mixture into a contaminant-rich fraction comprising the hydrocarbon and the one or more contaminants and a water-rich fraction;
    recovering the water from the water-rich fraction; and
    recovering the one or more contaminants from the contaminant-rich fraction.

2. The method of claim 1, wherein the aqueous mixture is derived from hydraulic fracturing.

3. The method of claim 1, wherein the aqueous mixture is derived from enhanced oil recovery.

4. The method of claim 1, wherein the aqueous mixture is derived from desalting of crude oil.

5. The method of claim 1, wherein the aqueous mixture is derived from isolation of hydrocarbons from oil tar sands.

6. The method of claim 1, further comprising characterizing the aqueous mixture to determine the one or more contaminants present therein, wherein characterizing the aqueous mixture comprises determining a conductivity of the aqueous mixture, a pH of the aqueous mixture, a density of the aqueous mixture, or a combination thereof.

7. The method of claim 1, wherein at least partially crystallizing the aqueous mixture comprises introducing the aqueous mixture to a cooling disk column crystallizer.

8. The method of claim 7, wherein the contaminant-rich fraction and the water-rich fraction in the cooling disk column crystallizer are separated by density.

9. The method of claim 1, wherein recovering the one or more contaminants from the contaminant-rich fraction comprises separating the one or more contaminants by filtration.

10. The method of claim 1, further comprising recovering a mother liquor from the contaminant-rich fraction and the water-rich fraction.

11. The method of claim 10, further comprising recovering a non-crystallizable contaminant from the mother liquor.

12. The method of claim 1, wherein the freezing point of the derived hydrocarbon process stream is substantially equal to the freezing point of the aqueous mixture prior to cooling the aqueous mixture to at least one eutectic temperature of the aqueous mixture.

13. The method of claim 1, wherein the one or more contaminants are identified prior to crystallization and predicted temperatures at which the one or more contaminants crystalize are used to determine an operating temperature of a crystallizer which is used to at least partially crystalize the aqueous mixture.

14. A method for purifying an aqueous mixture derived from a hydrocarbon process, comprising:
    deriving a hydrocarbon stream comprising water, hydrocarbon and one or more contaminants from a hydrocarbon process, the hydrocarbon stream having a first pH and a first conductivity;
    characterizing the hydrocarbon stream to determine the one or more contaminants present therein, wherein characterizing the hydrocarbon stream comprises determining the first conductivity of the hydrocarbon stream, the first pH of the hydrocarbon stream, a density of the hydrocarbon stream, or a combination thereof;
    at least partially crystallizing the hydrocarbon stream having a pH and conductivity substantially equal to the first pH and the first conductivity by cooling the hydrocarbon stream to at least one eutectic temperature of the hydrocarbon stream to provide an at least partially crystallized aqueous mixture that comprises a mother liquor, ice, the hydrocarbon and the one or more contaminants;

separating the at least partially crystallized aqueous mixture into a contaminant-rich fraction comprising the hydrocarbon and the one or more contaminants and a water-rich fraction;

recovering water from the water-rich fraction; and recovering the one or more contaminants from the contaminant-rich fraction.

15. The method of claim 14, wherein the hydrocarbon stream is derived from hydraulic fracturing, enhanced oil recovery, desalting of crude oil, isolation of hydrocarbons from oil tar sands, or a combination thereof.

16. The method of claim 14, wherein the freezing point of the derived hydrocarbon process stream is substantially equal to the freezing point of the hydrocarbon stream prior to cooling the hydrocarbon stream to at least one eutectic temperature of the hydrocarbon stream.

17. The method of claim 14, wherein the one or more contaminants are identified prior to crystallization and predicted temperatures at which the one or more contaminants crystalize are used to determine an operating temperature of a crystallizer which is used to at least partially crystallize the hydrocarbon stream.

* * * * *